(12) United States Patent
Yee et al.

(10) Patent No.: US 10,249,884 B2
(45) Date of Patent: Apr. 2, 2019

(54) THERMO-ELECTRO-CHEMICAL CONVERTERS AND METHODS OF USE THEREOF

(71) Applicant: Georgia Tech Research Corporation, Atlanta, GA (US)

(72) Inventors: Shannon Yee, Atlanta, GA (US); Andrei G. Fedorov, Atlanta, GA (US); Seung Woo Lee, Atlanta, GA (US); Alexander Limia, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 144 days.

(21) Appl. No.: 15/239,371

(22) Filed: Aug. 17, 2016

(65) Prior Publication Data

US 2017/0054155 A1 Feb. 23, 2017

Related U.S. Application Data

(60) Provisional application No. 62/207,051, filed on Aug. 19, 2015.

(51) Int. Cl.
| | | |
|---|---|---|
| *H01M 6/36* | (2006.01) | |
| *H01M 6/02* | (2006.01) | |
| *H01M 6/50* | (2006.01) | |

(52) U.S. Cl.
CPC .............. *H01M 6/36* (2013.01); *H01M 6/02* (2013.01); *H01M 6/5038* (2013.01)

(58) Field of Classification Search
CPC ...................................................... H01M 6/36
See application file for complete search history.

(56) References Cited

PUBLICATIONS

El-Genk MS & Tournier J-M. Optimization of liquid-return artery in a vapor-anode, multitube AMTEC. AIP Conference Proceedings 420, 1586 (1998).
El-Genk, M. S. & Tournier, J.-M. P. AMTEC/TE static converters for high energy utilization, small nuclear power plants. Energy Conversion and Management 45, 511-535, doi:http://dx.doi.org/10.1016/S0196-8904(03)00159-6 (2004).
Hendricks, T. J. & Huang, C. High-Performance Radial AMTEC Cell Design for Ultra-High-Power Solar AMTEC Systems. Journal of Solar Energy Engineering 122, 49-55, doi:10.1115/1.1286219 (2000).
Lodhi, M. A. K. & Daloglu, A. Design and material variation for an improved power output of AMTEC cells. Journal of power sources 93, 32-40 (2001).
Ryan, M. A. et al. Directly Deposited Current Collecting Grids for Alkali Metal Thermal-to-Electric Converter Electrodes. Journal of the Electrochemical Society 142, 4252-4256, doi:10.1149/1.2048492 (1995).
Schock, A., Noravian, H., Kumar, V. & Chuen, O. in Energy Conversion Engineering Conference, 1997. IECEC-97., Proceedings of the 32nd Intersociety. 1136-1151 vol. 1132.

(Continued)

*Primary Examiner* — Wyatt P McConnell
(74) *Attorney, Agent, or Firm* — Thomas Horstemeyer, LLP

(57) ABSTRACT

The present disclosure provides compositions including thermo-electro-chemical converter, methods of converting thermal energy into electrical energy, and the like. In general, embodiments of the present disclosure can be used to convert thermal energy into electrical energy by way of a chemical process.

19 Claims, 8 Drawing Sheets

(56) References Cited

PUBLICATIONS

Schock, A., Noravian, H. & Chuen, O. in Energy Conversion Engineering Conference, 1997. IECEC-97., Proceedings of the 32nd Intersociety. 1156-1164 vol. 1152.

Schock, A., Noravian, H., Or, C. & Kumar, V. in Space technology and applications international forum (STAIF-97). 1395-1404 (AIP Publishing).

Schock, A., Noravian, H., Or, C. & Kumar, V. Design, Analyses, and Fabrication Procedure of Amtec Cell, Test Assembly, and Radioisotope Power System for Outer-Planet Missions. Acta Astronautica 50, 471-510, doi:http://dx.doi.org/10.1016/50094-5765(01)00168-0 (2002).

Sievers, R. K. et al. in Energy Conversion Engineering Conference, 1997. IECEC-97., Proceedings of the 32nd Intersociety. 1125-1129 vol. 1122. 28 Tanaka, K. Concept design of solar thermal receiver using alkali metal thermal to electric converter (AMTEC). Current Applied Physics 10, S254-S256 (2010).

Tournier, J.-M. & El-Genk, M. S. AMTEC Performance and Evaluation Analysis Model (APEAM): Comparison with test results of PX-4C, PX-5A, and PX-3A cells. AIP Conference Proceedings 420, 1576-1585, doi:doi:http://dx.doi.org/10.1063/1.54787 (1998).

Tournier, J.-M. & El-Genk, M. S. Radiation/conduction model for multitube AMTEC cells. AIP Conference Proceedings 420, 1552-1564, doi:doi:http://dx.doi.org/10.1063/1.54784 (1998).

Tournier, J.-M. & El-Genk, M. S. Sodium vapor pressure losses in a multitube, alkali-metal thermal-to-electric converter. Journal of thermophysics and heat transfer 13, 117-125 (1999).

Tournier, J.-M., El-Genk, M. S., Schuller, M. & Hausgen, P. An analytical model for liquid-anode and vapor-anode AMTEC converters. AIP Conference Proceedings 387, 1543-1552, doi:doi:http://dx.doi.org/10.1063/1.51977 (1997).

Tournier, J. M. & El-Genk, M. S. An electric model of a vapour anode, multitube alkali-metal thermal-to-electric converter. Journal of Applied Electrochemistry 29, 1263-1275, doi:10.1023/A:1003728129770 (1999).

Underwood, M. L., Williams, R. M., Jeffries-Nakamura, B., Ryan, M. A. & O'Connor, D. Performance projections of alternative AMTEC systems and devices. AIP Conference Proceedings 217, 472-481, doi:doi:http://dx.doi.org/10.1063/1.40141 (1991).

Underwood, M. L., Williams, R. M., Ryan, M. A., Jefferies-Nakamura, B. & O'Connor, D. An AMTEC vapor-vapor, series connected cell. AIP Conference Proceedings 246, 1331-1337, doi:doi:http://dx.doi.org/10.1063/1.41758 (1992).

Vining, C. B., Williams, R. M., Underwood, M. L., Ryan, M. A. & Suitor, J. W. Reversible Thermodynamic Cycle for AMTEC Power Conversion. Journal of The Electrochemical Society 140, 2760-2763, doi:10.1149/1.2220907 (1993).

Weber, N. A thermoelectric device based on beta-alumina solid electrolyte. Energy Conversion 14, 1-8, doi:http://dx.doi.org/10.1016/0013-7480(74)90011-4 (1974).

Wheeler, B. L. et al. Performance and impedance studies of thin, porous molybdenum and tungsten electrodes for the alkali metal thermoelectric converter. Journal of Applied Electrochemistry 18, 410-416, doi:10.1007/BF01093756 (1988).

Williams, R. M. et al. Sodium transport modes in AMTEC electrodes. (1998).

Williams, R. M., Jeffries-Nakamura, B., Underwood, M. L., Bankston, C. P. & Kummer, J. T. Kinetics and Transport at AMTEC Electrodes: II . Temperature Dependence of the Interfacial Impedance of Na(g)/Porous Mo/Na-Beta' Alumina. Journal of The Electrochemical Society 137, 1716-1723, doi:10.1149/1.2086787 (1990).

Williams, R. M. et al. Kinetics and Transport at AMTEC Electrodes: I . The Interfacial Impedance Model. Journal of The Electrochemical Society 137, 1709-1716, doi:10.1149/1.2086775 (1990).

Williams, R. M. et al. The thermal stability of sodium beta"-Alumina solid electrolyte ceramic in AMTEC cells. AIP Conference Proceedings 458, 1306-1311, doi:doi:http://dx.doi.org/10.1063/1.57523 (1999).

Williams, R. M. et al. in Meeting Abstracts Ð Electrochemical Society Ð All Divisions Ð. 1091-8213.

Wu, S.-Y., Xiao, L., Cao, Y. & Li, Y.-R. A parabolic dish/AMTEC solar thermal power system and its performance evaluation. Applied Energy 87, 452-462, doi:http://dx.doi.org/10.1016/j.apenergy.2009.08.041 (2010).

Wu, S.-Y., Xiao, L. & Cao, Y.-D. A review on advances in alkali metal thermal to electric converters (AMTECs). International Journal of Energy Research 33, 868-892, doi:10.1002/er.1584 (2009).

Merrill, J. M. & Mayberry, C. Experimental investigation of multi-AMTEC cell ground demonstration converter systems based on PX-3 and PX-5 series AMTEC cells. AIP Conference Proceedings 458, 1369-1377, doi:doi:http://dx.doi.org/10.1063/1.57531 (1999).

Merrill, J. M., Schuller, M. & Huang, L. Vacuum testing of high efficiency multi-base tube AMTEC cells: Feb. 1997-Oct. 1997. AIP Conference Proceedings 420, 1613-1620, doi:doi:http://dx.doi.org/10.1063/1.54792 (1998).

Merrill, J. M. et al. in Energy Conversion Engineering Conference, 1997. IECEC-97., Proceedings of the 32nd Intersociety. 1184-1189 vol. 1182.

Tanaka, K. Concept design of solar thermal receiver using alkali metal thermal to electric converter (AMTEC). Current Applied Physics 10, S254-S256 (2010).

Alger, D. Some Corrosion Failure Mechanisms of AMTEC Cells. Energy Conversion Engineering Conference, 1997. IECEC-97., Proceedings of the 32nd Intersociety. 1224-1229 vol. 2.

Alkhateeb, A. et al. Electrochemical evaluation of the corrosion behavior of steel coated with titanium-based ceramic layers. Surface & Coatings Technology 205 (2011) 3006-3011.

Bankston CP et al. Recent advances in Alkali Metal Thermoelectric Converter (AMTEC) electrode performance and modeling. SPIE vol. 871 Space Structures, Power, and Power Conditioning (1988).

Bankston CP et al. Experimental and Systems Studies of the Alkali Metal Thermoelectric Converter for Aerospace Power. J. Energy vol. 7, No. 5, p. 442-448.

Briggs JB. AMTEC Power Output Optimization by Investigating the Grain Size Effect on Its Electrode Materials. MS thesis. Texas Tech University. Dec. 2006.

Chan KY and Teo BS. Effect of Ar pressure on grain size of magnetron sputter-deposited Cu thin films. IET Sci. Meas. Technol., 2007, 1, (2), pp. 87-90.

Chou TC et al. Microstructural evolution and properties of nanocrystalline alumina made by reactive sputtering deposition. Thin Solid Films, 205 (1991) 131-139.

Cole T. Thermoelectric Energy Conversion with Solid Electrolytes. Science, New Series, vol. 221, No. 4614 (Sep. 2, 1983), pp. 915-920.

Crowley CJ. Condensation of sodium on a micromachined surface for AMTEC. AIP Conference Proceedings 271, 897 (1993); doi: 10.1063/1.43115.

Crowley CJ et al. Performance of a Wick Return AMTEC Cell With a Micromachined Condenser. Intersociety Energy Conversion Engineering Conference, International Energy Conversion Engineering Conference (IECEC).

Devries RC and Roth WL. Critical Evaluation of the Literature Data on Beta Alumina and Related Phases: I, Phase Equilibria and Characterization of Beta Alumina Phases. Journal of The American Ceramic Society vol. 52, No. 7.

Fang Q. and Zhang J-Y. Nano-porous TiN thin films deposited by reactive sputtering method. International Journal of Inorganic Materials 3 (2001) 1193-1196.

Fang QI and Knodler R. Porous $TiB_2$ electrodes for the alkali metal thermoelectric convertor. Journal of Materials Science 27 (1992) 6725-6729.

Ferre FG. et al. Advanced $Al_2O_3$ coatings for high temperature operation of steels in heavy liquid metals: a preliminary study. Corrosion Science 77 (2013) 375-378.

Fletcher RW and Schwank JW. Recent Developments in Mixed Ionic and Electronic Conducting Electrodes for the Alkali Metal Thermal Electric Converter (AMTEC). AIP Conf. Proc. 654, 722 (2003).

Crouthamel CE and Recht HL (eds). Regenerative EMF Cells. Advances in Chemistry Series. 1American Chemical Society 1967.

(56) References Cited

PUBLICATIONS

Gros P et al. Sodium-Aluminum-Oxygen Phase Diagram and its Application to Solid-State Electrochemistry. J. Electrochem. Soc., vol. 138, No. 1, Jan. 1991.

Hasimoto T. et al. Screen-printed electrode for alkali-metal thermoelectric converter. Journal of Materials Science Letters 11 (1992) 745-748.

Hendricks TJ and Huang C. Quantifying and Minimizing Entropy Generation in AMTEC Cells. Energy Conversion Engineering Conference, 1997. IECEC-97., Proceedings of the 32nd Intersociety.

Hlain Oo WM et al. Grain Size and Texture of $CU_2ZnSnS_4$ Thin Films Synthesized by Cosputtering Binary Sulfides and Annealing: Effects of Processing Conditions and Sodium. Journal of Electronic Materials Nov. 2011, 40:2214.

Hodge JD. Kinetics of the Beta"-to-Beta Transformation in the System $Na_2O-Al_2O_3$. Journal of the American Ceramic Society vol. 66, No. 3.

Kennedy JH. The Beta-Aluminas. In Solid Electrolytes. vol. 21 of the series Topics in Applied Physics pp. 105-141.

Kim S-D et al. Microstructure and electrical conductivity of Mo/TiN composite powder for alkali metal thermal to electric converter electrodes. Ceramics International 40 (2014) 3847-3853.

Kim S-D et al. Novel Mo/TiN composites for an alkali metal thermal-to-electric converter (AMTEC) electrode. Ceramics International 40 (2014) 14247-14252.

King JC. and El-Genk MS. Review of Refractory Materials for Alkali Metal Thermal-to-Electric Conversion Cells. Journal of Propulsion and Power vol. 17, No. 3, May-Jun. 2001.

Langmuir I. The Vapor Pressure of Metallic Tungsten. in The Physical Review, Second Series, Nov. 1913. vol. II No. 5.

Lee Ye et al. Effect of oblique sputtering on microstructural modification of ZnO thin films. J. Vac. Sci. Technol. A 15(3), May/Jun. 1997, pp. 1194-1199.

Levy JC et al. AMTEC: Current Status and Vision. Energy Conversion Engineering Conference, 1997. IECEC-97., Proceedings of the 32nd Intersociety. pp. 1152-1155 vol. 2.

Lodhi Mak et al. An overview of advanced space/terrestrial power generation device: AMTEC. Journal of Power Sources 103 (2001) 25-33.

Lodhi Mak & Daloglu A. Effect of geometrical variations on AMTEC cell heat losses. Journal of Power Sources 91 (2000). 99-106.

Lodhi Mak & Daloglu A. Effect of radiation shield on pressure losses and power output of AMTEC cell. Journal of Power Sources 93 (2001) 258-267.

Lodhi Mak & Malka VR. Optimization of the TIEC/AMTEC cascade cell for high efficiency. Journal of Power Sources 156 (2006) 685-691.

Lodhi Mak & Daloglu A. Performance parameters of material studies for AMTEC cell. Journal of Power Sources 85 (2000). 203-211.

Lodhi Mak et al. Simulation and analysis of time-dependent degradation behavior of AMTEC. Journal of Power Sources 96 (2001) 343-351.

Lodhi Mak & Briggs JB. Temperature effect on lifetimes of AMTEC electrodes. Journal of Power Sources 168 (2007) 537-545.

Lodhi Mak & Mustafa A. Use of waste heat of TIEC as the power source for AMTEC. Journal of Power Sources 158 (2006) 740-746.

Mackay TL. Oxidation of Zirconium and Zirconium Alloys in Liquid Sodium. Journal of the Electrochemical Society Sep. 1963. vol. 110, No. 9. pp. 960-964.

Makansi MM. Determination of the Vapor Pressure of Sodium. J. Phys. Chem., 1955, 59 (1), pp. 40-42.

May GJ & Henderson CMB. Thermal expansion behaviour of sodium-beta-alumina. Journal of Materials Science 14 (1979) 1229-1237.

Nakata H. et al. Ceramic electrodes for an alkali metal thermoelectric converter (AMTEC). Journal of Applied Electrochemistry 23 (1993) 1251 1258.

Onea A. et al. AMTEC Clusters for Power Generation in a Concentrated Solar Power Plant. Magnetohydrodynamics vol. 51 (2015), No. 3, pp. 495-507.

Roth RS and Schneider SJ (eds). Solid State Chemistry. US Department of Commerce, Jul. 1972.

Ryan MA et al. Electrode, current collector, and electrolyte studies for AMTEC cells. AIP Conference Proceedings 271, 905 (1993).

Ryan MA et al. Lifetimes of AMTEC electrodes: Molybdenum, rhodium-tungsten, and titanium nitride. AIP Conference Proceedings 504, 1377 (2000).

Ryan MA et al. Lifetimes of Thin Film AMTEC Electrodes. Intersociety Energy Conversion Engineering Conference, International Energy Conversion Engineering Conference (IECEC) 1994.

Ryan MA et al. Performance parameters of TiN electrodes for AMTEC cells. AIP Conference Proceedings 458, 1301 (1999).

Ryan MA. The Alkali Metal Thermal-to-Electric Converter for Solar System Exploration. IEEE 18th International Conference on Thermoelectrics (1999).

Ryan MA. Thermophysical Properties of Sodium Beta"-Alumina Polycrystalline Ceramic. J. Phys. Chem Solids vol. 55. No. 11 pp. 1255-1260 (1994).

Schock A. et al. Coupled thermal, electrical, and fluid flow analyses of AMTEC multitube cell with adiabatic side wall. AIP Conference Proceedings 387, 1381 (1997).

Schock A. Design, Analyses, and Fabrication Procedure of AMTEC Cell, Test Assembly, and Radioisotope Power System for Outer-Planet Missions. Acta Astronautica vol. 50, No. 8, pp. 471-510, 2002.

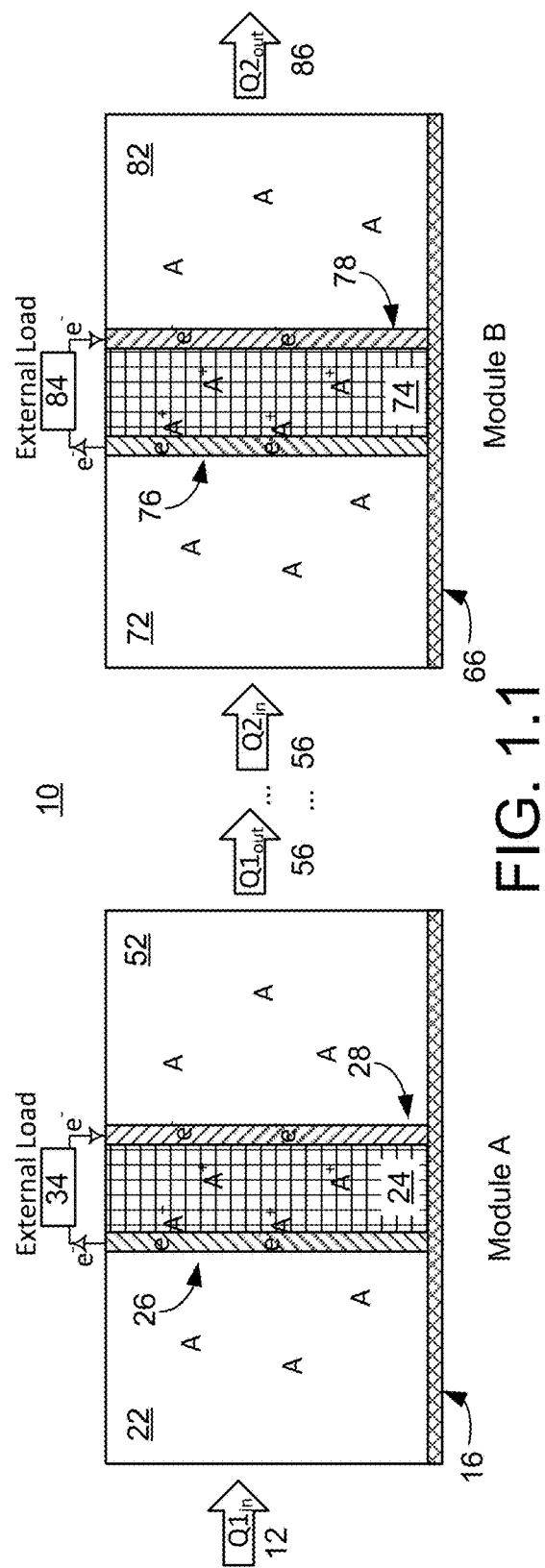
FIG. 1.1

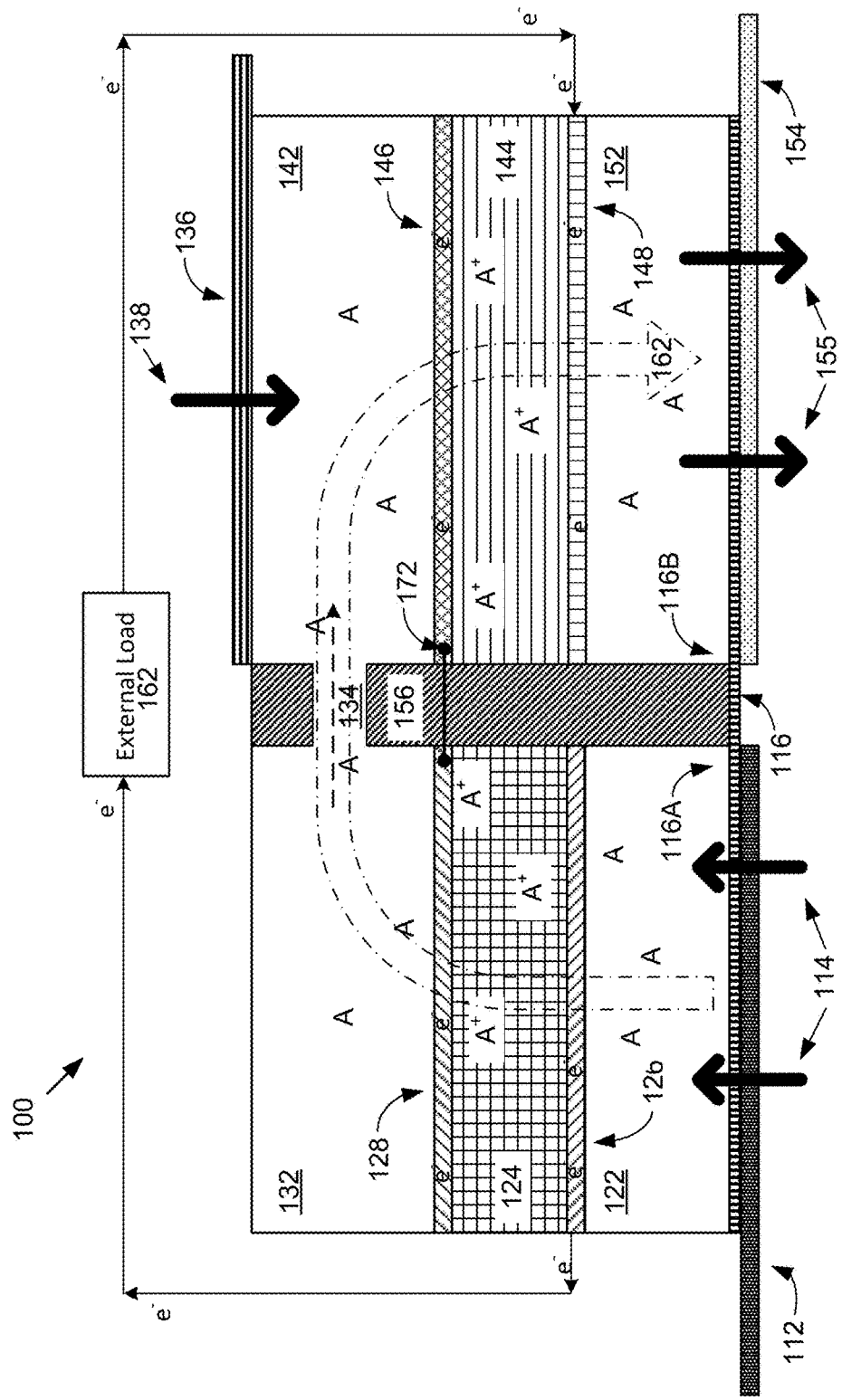
FIG. 1.2

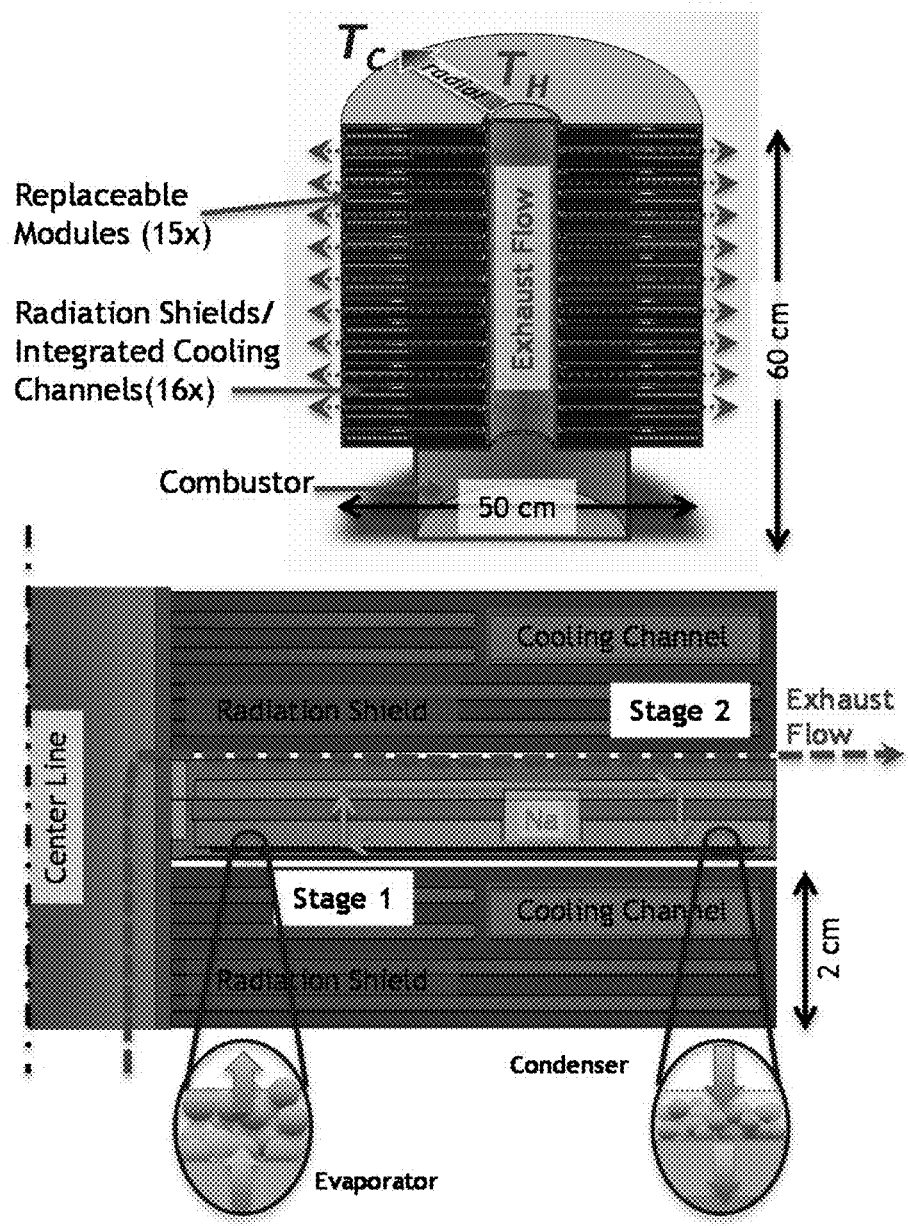
FIG. 2.1

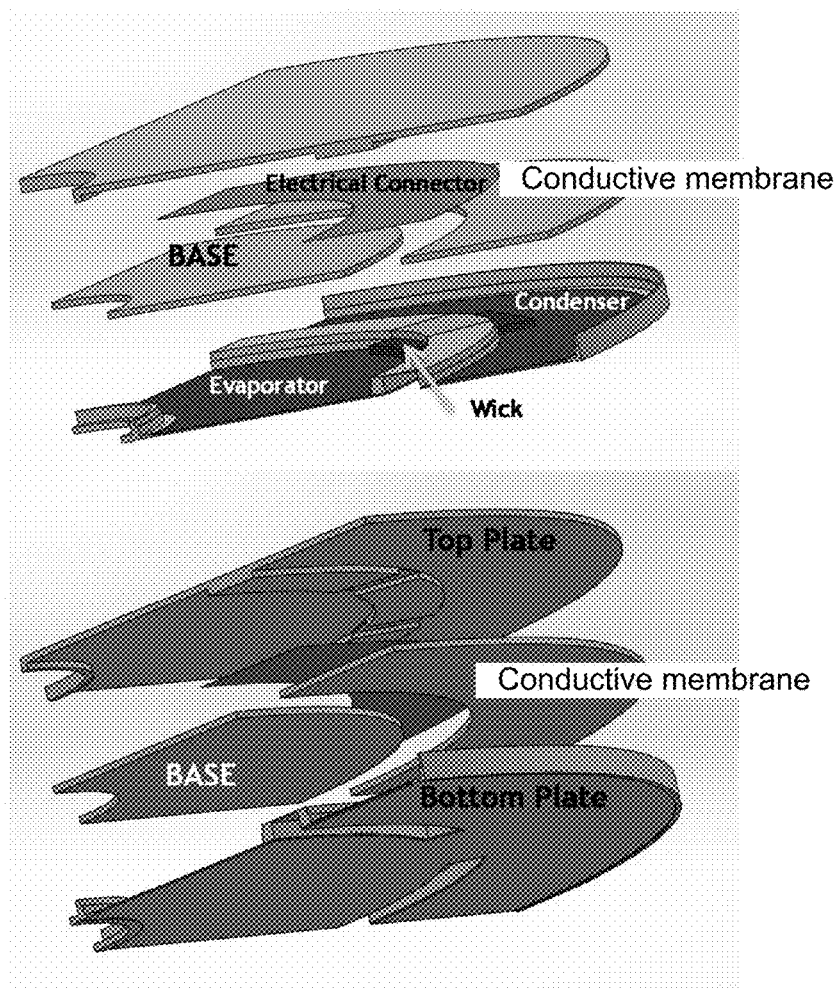
FIG. 2.2

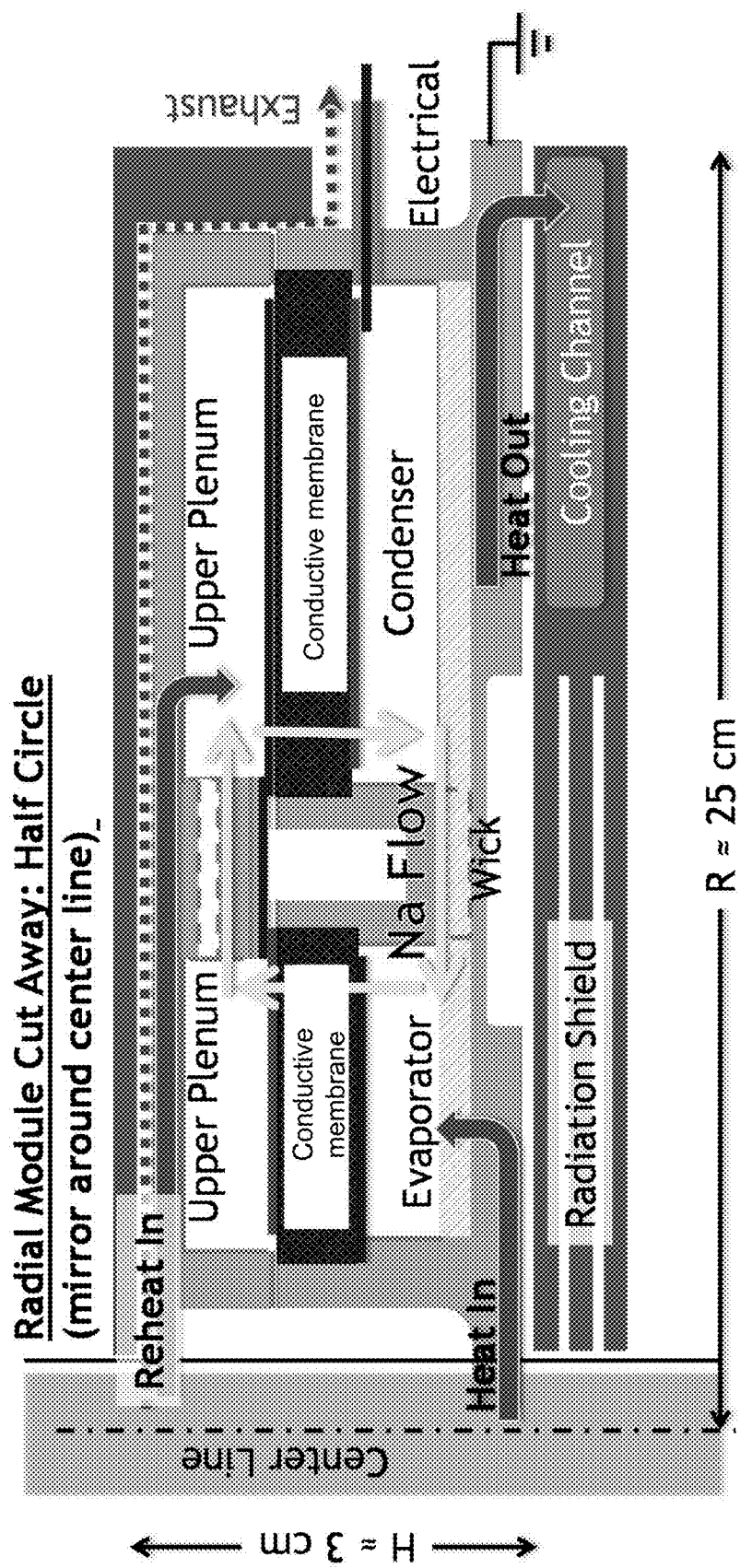
FIG. 2.3

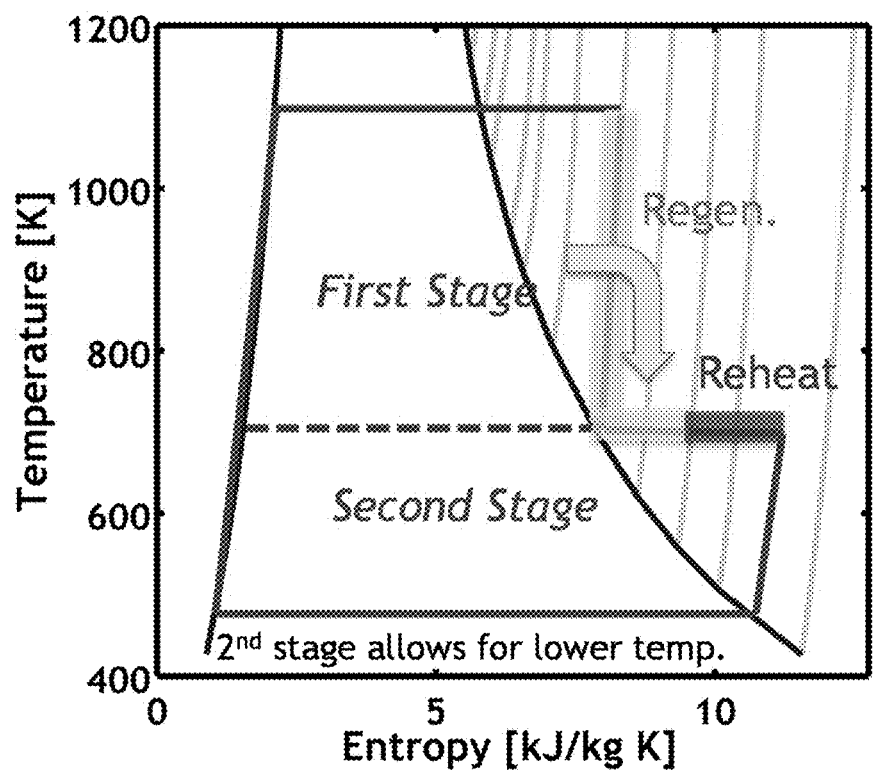
FIG. 2.4

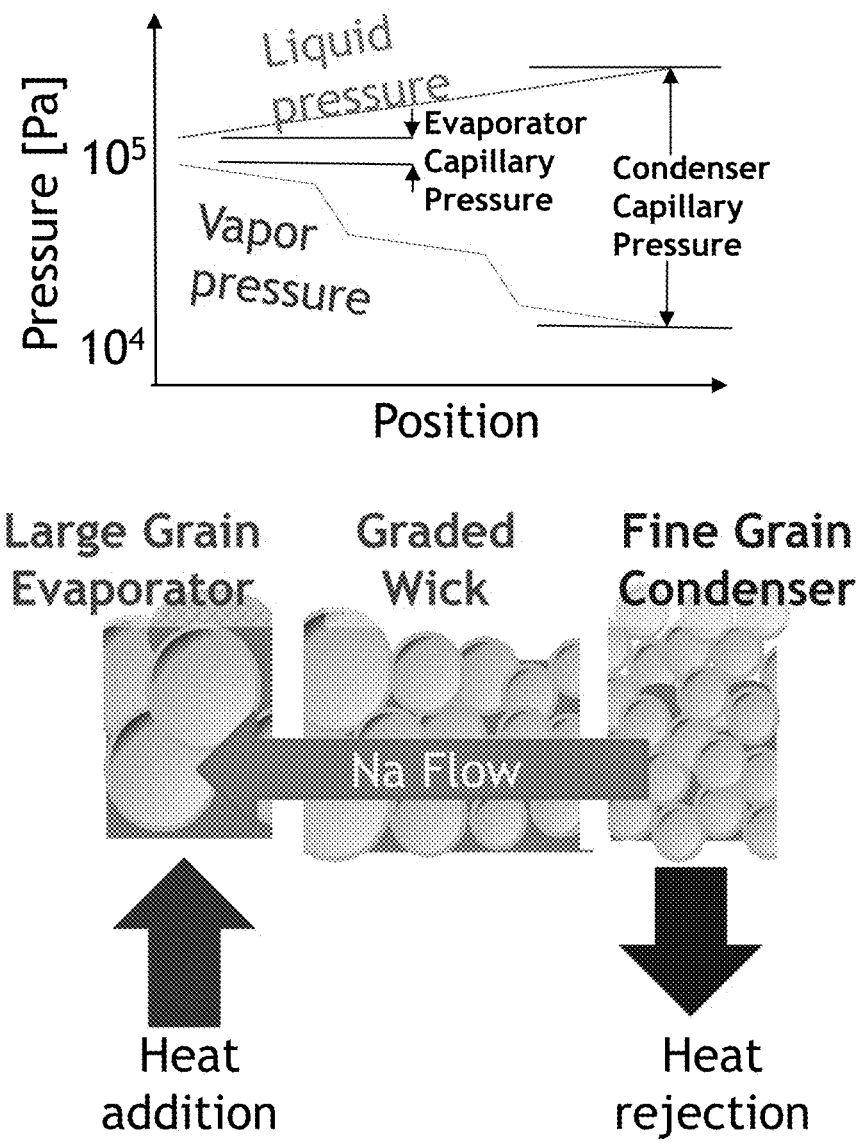
FIG. 2.5

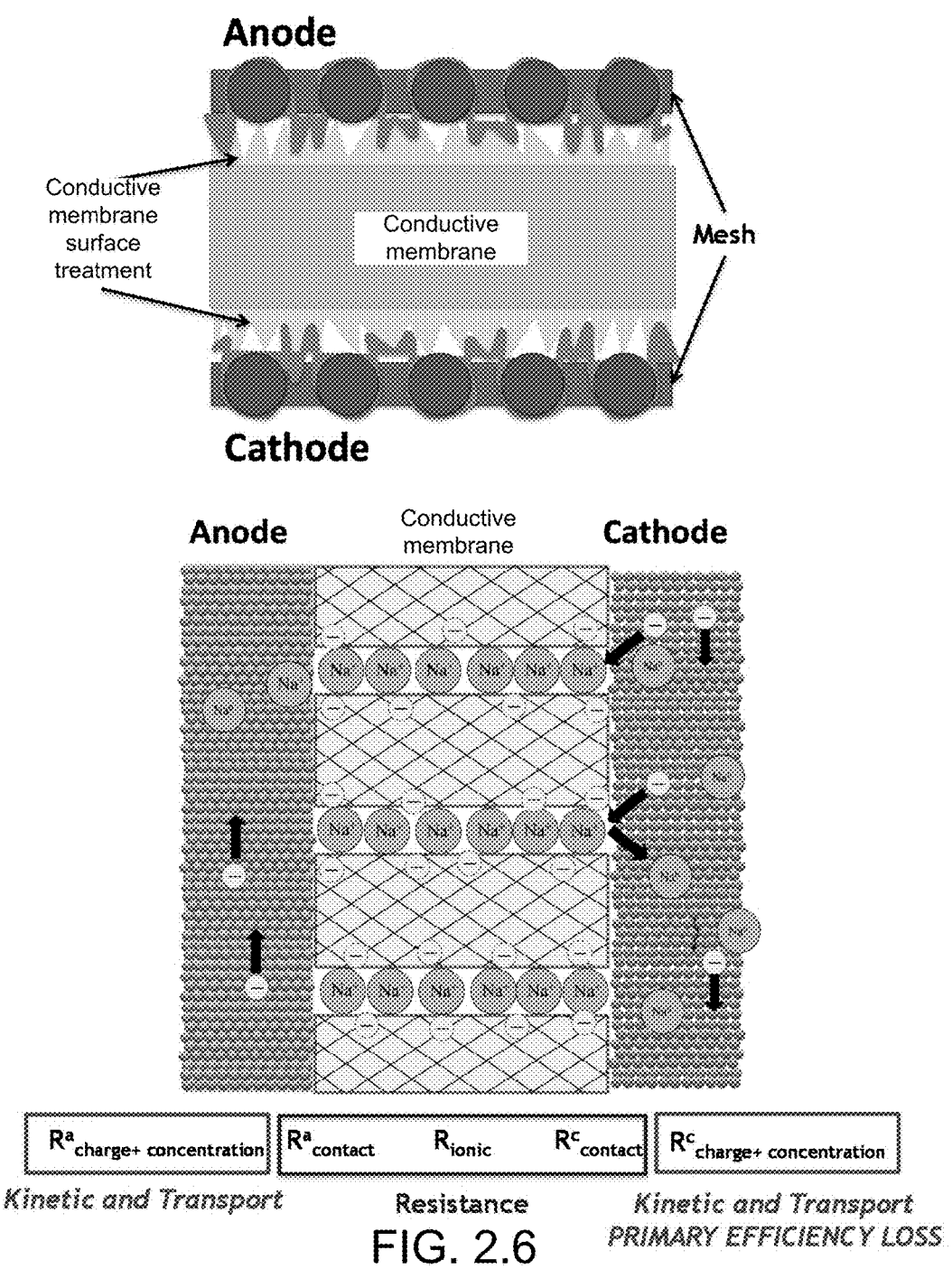
FIG. 2.6

THERMO-ELECTRO-CHEMICAL CONVERTERS AND METHODS OF USE THEREOF

CLAIM OF PRIORITY TO RELATED APPLICATION

This application claims priority to U.S. provisional application entitled "Sodium Thermal-Electro-Chemical (Na-TEC) Generator" having Ser. No. 62/207,051, filed on Aug. 19, 2015, which is entirely incorporated herein by reference.

BACKGROUND

Sodium ion heat engines were first developed in the 1960s and saw renewed interest in the early 1990s-2000s. Unfortunately as device development continued, optimization was based on semi-empirical imperfect models, and as a result, demonstrated prototypes never achieved their full thermodynamic potential because they lacked proper thermal engineering. Thus, there is a need to overcome these deficiencies.

SUMMARY

The present disclosure provides compositions including thermo-electro-chemical converter, methods of converting thermal energy into electrical energy, and the like. In general, embodiments of the present disclosure can be used to convert thermal energy into electrical energy by way of a chemical conversion.

An embodiment of the present disclosure includes a thermo-electro-chemical converter, among others, that includes: an evaporator chamber, wherein a first heat source is in thermal communication with the evaporator chamber, wherein a first condensed fluid is evaporated in the evaporator chamber to form a first neutral gas; a first plenum; a first ionically conductive membrane positioned between the evaporator chamber and the first plenum, wherein a first anode is in contact with the first ionically conductive membrane and exposed to the evaporator chamber, wherein a first cathode is in contact with the first ionically conductive membrane on the side opposite the evaporator chamber, wherein the first ionically conductive membrane is conductive to only cations of the first neutral gas, wherein a first cation and an electron are formed from the interaction of the first neutral gas with the first ionically conductive membrane and the first anode, wherein the first cathode interacts with the first cation and an electron at contact with the first ionically conductive membrane to produce a second neutral gas in the first plenum; a second plenum, wherein a connecting channel connects the first plenum with the second plenum and receives the second neutral gas from the first plenum through the connecting channel; a second ionically conductive membrane positioned between the second plenum and a condensation chamber, wherein a second anode is positioned on the second ionically conductive membrane and exposed to the second plenum, wherein a second cathode is in contact with the second ionically conductive membrane and exposed to the condensation chamber, wherein the second ionically conductive membrane is conductive to only cations of the second neutral gas, wherein a second cation is formed from the interaction of the second neutral gas with the second ionically conductive membrane and the second anode, wherein the second cathode interacts with the second cation and an electron to produce the third neutral gas at contact with the second ionically conductive membrane, wherein the condensation chamber receives the third neutral gas, wherein the condensation chamber is in thermal communication with a cooling element, wherein the third neutral gas is condensed into a second condensed fluid in the condensation chamber; and a pumping device connecting the condensation chamber and the evaporator chamber, wherein the second condensed fluid flows from the condensation chamber to the evaporator chamber, wherein an electrical circuit is formed as a result of the first cathode and the second anode being in electrical communication and the first anode and the second cathode being in electrical communication, wherein electrons in the second anode travel to the first cathode, wherein electrons in the first anode travel through the electrical circuit and into the second cathode, wherein the second anode, first cathode, first anode, and the second cathode are electrically connected, wherein conversion of the first neutral gas to the first cation generates an electron, conversion of the first cation to the second neutral gas consume an electron, conversion of the second neutral gas to the second cation generates an electron, and conversion of the second cation to the third neutral gas consume an electron, wherein the generation and consumption of the electrons produces an electrical current in the electrical circuit.

An embodiment of the present disclosure includes a system, among others, that includes: a plurality of thermo-electro-chemical converters as described herein, specifically, the one described above and in the claims, wherein each of the plurality of thermo-electro-chemical converters share the first heat source and electrically connected in parallel or series.

An embodiment of the present disclosure includes a method of generating electrical energy from thermal energy, among others, that includes: evaporating a first condensed fluid using thermal energy to form a first neutral gas; oxidizing the first neutral gas to form a first cation and an electron at the interface of a first anode and a first ionically conductive membrane; flowing the first cation across the first ionically conductive membrane; reducing the first cation to a second neutral gas with an electron at the interface of a first cathode and the first conductive membrane, wherein the first anode and the first cathode are not electrically connected to one another; oxidizing the second neutral gas to form a second cation and an electron at the interface of a second anode and a second ionically conductive membrane; flowing the second cation across the second ionically conductive membrane; reducing the second cation to a third neutral gas using an electron at the interface of a second cathode and the second conductive membrane, wherein the second anode and the second cathode are not electrically connected to one another; and condensing the third neutral gas to a second condensed fluid, wherein an electrical circuit is formed as a result of the first cathode and the second anode being in electrical communication and the first anode and the second cathode being in electrical communication, wherein electrons in the second anode travel to the first cathode, wherein electrons in the first anode travel through the electrical circuit and into the second cathode, wherein the second anode, first cathode, first anode and the second cathode are electrically connected, wherein conversion of the first neutral gas to the first cation generates an electron, conversion of the first cation to the second neutral gas consume an electron, conversion of the second neutral gas to the second cation generates an electron, and conversion of the second cation to the third neutral gas consume an electron, wherein the generation and consumption of the electrons produces an electrical current in the electrical circuit.

An embodiment of the present disclosure includes a thermo-electro-chemical converter, among others, that includes: a first evaporator chamber, wherein a first heat source is in thermal communication with the first evaporator chamber, wherein a first condensed fluid is evaporated in the first evaporator chamber to form a first neutral gas; a first ionically conductive membrane positioned between the first evaporator chamber and a first condensation chamber, wherein a first anode is in contact with the first conductive membrane and exposed to the evaporator chamber, wherein a first cathode is in contact with the first ionically conductive membrane and exposed to the first condensation chamber, wherein the first conductive membrane is conductive to only cations of the first neutral gas, wherein a first cation and an electron are formed from the interaction of the first neutral gas with the first ionically conductive membrane and the first anode, wherein the first cathode interacts with the first cation and an electron at contact with the first ionically conductive membrane to produce a second neutral gas, wherein the first condensation chamber receives the second neutral gas, wherein the second neutral gas is condensed in the first condensation chamber into a second condensed fluid; a second evaporator chamber, wherein the first condensation chamber is in thermal communication with the second evaporator chamber, wherein the heat from the first condensation chamber causes evaporation of a third condensed fluid to form a third neutral gas; a second ionically conductive membrane positioned between the second evaporator chamber and a second condensation chamber, wherein a third anode is in contact with the second conductive membrane and exposed to the second evaporator chamber, wherein a second cathode is in contact with the second ionically conductive membrane and exposed to the second condensation chamber, wherein the second conductive membrane is conductive to only cations of the third neutral gas, wherein a second cation and an electron are formed from the interaction of the third neutral gas with the second ionically conductive membrane and the second anode, wherein the second cathode interacts with the second cation and an electron at contact with the second ionically conductive membrane to produce a fourth neutral gas, wherein the second condensation chamber receives the fourth neutral gas, wherein the fourth neutral gas is condensed in the second condensation chamber into the fourth condensed fluid, wherein a first electrical circuit is formed as a result of the first anode and the first cathode being in electrical communication and a second electrical circuit is formed as a result of the second anode and the second cathode being in electrical communication, wherein conversion of the first neutral gas to the first cation generates an electron and conversion of the first cation to the second neutral gas consume an electron and produces a first electrical current in the first electrical circuit, wherein conversion of the third neutral gas to the second cation generates an electron and conversion of the second cation to the fourth neutral gas consume an electron and produces a second electrical current in the second electrical circuit, wherein the first electrical circuit and the second electrical circuit are connected electrically in series.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 1.1 is a cross-sectional diagram of an embodiment of a thermo-electro-chemical converter.

FIG. 1.2 is a cross-sectional diagram of another embodiment of a thermo-electro-chemical converter.

FIG. 2.1 illustrates (top) a cutout of module stack assembly and (bottom) a cutout of a single about 60 to 80 $W_e$ module.

FIG. 2.2 illustrates an exploded view of an individual module. The top and bottom plates can, optionally, be coated with a resistant ceramic (e.g., a Na resistant ceramic) coating to further prevent corrosion and leaching of chemicals that are chemically poisonous to the electrode and electrolyte materials.

FIG. 2.3 illustrates a converter cut away that show a two stage operation. Ions first expand from the evaporator to the upper plenum across an ion-conducting solid electrolyte (e.g., β"-aluminum solid electrolyte) generating electricity which flows through an external load; anode in blue, cathode in red. Regeneration and reheat are accomplished in the upper plenum. Cathode of stage 1 is electrically connected to the anode of stage 2. Ions next expand from the upper plenum to the condenser across another ion-conducting solid-electrolyte, generating electricity which flows through an external load. The case (grey) is coated with a corrosion resistant ceramics (e.g., TiN, SiC, $Al_2O_3$, as well as others) to prevent impurity leaching that degrade the electrodes/electrolytes.

FIG. 2.4 illustrates multi-stage T-s diagram. A second stage takes advantage of regeneration of thermal energy and intermediate stage reheat. Thus allowing the cycle to achieve lower condenser temperatures and higher efficiencies.

FIG. 2.5 illustrates structural features of the porous evaporator, condenser, and graded wick connecting condenser and evaporator in the case when these parts are made of or internally coated with a phobic material (e.g., phobic to the working fluid such as Na), which is typically a characteristics of materials used for corrosion and leaching protection. The condenser has the smallest pore/void sizes, the evaporator has the largest pore/void sizes and the wick has the graded structure with pore size increasing from its part connected to the condenser toward its part connected to the evaporator. In the case of an evaporator and condenser material or coating being philic to the working fluid, the situation is reversed with the condenser having the larger pore sizes, the evaporator having the smaller pore sizes, and the wick pores decreasing in size going from the condenser to the evaporator. In either case, the flow is driven by capillary pressure gradient resulting from the highest liquid pressure at the condenser down to lowest pressure in the evaporator (local capillary pressure head is inversely proportional to the void/pore size and is added to the hydrostatic liquid pressure in the case of a phobic material or subtracted from the hydrostatic liquid pressure in the case of the philic material).

FIG. 2.6 illustrates an electrode-electrolyte (electrode-ion conductive membrane) assembly. Surface treated electrolyte with electrically conducting mesh and conformal porous electrode deposition creates a three dimensional porous electrode as shown in the top, while in the bottom the solid electrolyte is a quasi-1D transport conductor are shown. Making the solid electrolyte thin minimizes ionic resistance overpotential. The cathodic overpotential limits efficiency.

DETAILED DESCRIPTION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method may be carried out in the order of events recited or in any other order that is logically possible.

Embodiments of the present disclosure will employ, unless otherwise indicated, techniques of engineering, chemistry, energy, physics, and the like, which are within the skill of the art. Such techniques are explained fully in the literature.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion:

The present disclosure provides compositions including thermo-electro-chemical converter, methods of converting thermal energy into electrical energy, and the like. In general, embodiments of the present disclosure can be used to convert thermal energy into electrical energy by way of a chemical process.

Embodiments of the present disclosure can be advantageous in that a multi-stage converter is used that offers the potential to achieve higher efficiencies than previous converters. In an embodiment, the convertor offers better stability and lifetime of the electrolyte by operating at lower temperatures with an impurity mitigation strategy that reduces or prevents electrode/electrolyte degradation. In an embodiment, the converter can use three dimensional porous electrodes that can use different materials for each stage, which reduces the overpotential and improves lifetime. For example, in the relatively higher temperature first stage, a material (e.g., a refractory alloys, such as $Rh_xW$ (x=0.5-3), and mixed ionic-electronic conducting metal oxides, including $TiN/Na_x$—$TiO_2$ and $Mo/Na_x$—$TiO_2$ (x=0-1)) can be used and another material (e.g., Mo-based electrodes) can be used in the second stage that is cooler than the first stage. In an embodiment, the thermal-fluid management (e.g., pumping device) can be improved by structuring the evaporator to be less material-phobic (e.g., Na-phobic) (thus promoting quasi-film vaporization reducing the super-heating and energy destruction), and structuring the condenser to be more material-phobic (e.g., Na-phobic) (thus promoting dropwise condensation reducing the under-cooling and energy destruction). In an embodiment, the pumping device can have a topologically grading to establish strong capillary pressure gradient to enable fully passive capillary pumping.

An embodiment of the present disclosure includes a thermo-electro-chemical converter (FIG. 1.1) that includes two or more modules, where each module generates electrical energy. As shown in FIG. 1.1, the thermo-electro-chemical converter 10 includes module A and module B, but it should be noted that additional modules can be included where the thermal energy from the previous module is used by the subsequent module. FIG. 1.1 illustrates that the thermal energy ($Q1_{out}$) 56 from module A is used as the thermal energy ($Q2_{in}$) for module B, which results in efficient use of the initial thermal energy ($Q1_{in}$) 12.

In an embodiment, module A includes a first evaporator chamber 22, where a first heat source 12 is in thermal communication with the first evaporator chamber 22. A first condensed fluid (not shown) (working fluid/gas/cations) is evaporated in the first evaporator chamber 22 to form a first neutral gas (shown as A).

In addition, module A includes a first ionically conductive membrane 24 positioned between the first evaporator chamber 22 and a first condensation chamber 52. A first anode 26 is in contact (e.g., disposed on the surface and/or recessed into the ionically conductive membrane) with the first conductive membrane 24 and exposed (e.g., so that the first conductive membrane 24 faces) to the evaporator chamber 22. A first cathode 28 is in contact with the first ionically conductive membrane 24 and exposed to the first condensation chamber 52. In an embodiment, the first conductive membrane 24 is conductive to only cations of the first neutral gas.

In an embodiment, a first cation ($A^+$) and an electron are formed from the interaction of the first neutral gas with the first ionically conductive membrane 24 and the first anode 26. The first cations flow across the first ionically conductive membrane 24. The first cathode 28 interacts with the first cation and an electron at contact with the first ionically conductive membrane 24 to produce a second neutral gas (also shown as A). The first anode 26 and the first cathode 28 are connected to an external load to form a first circuit 34, where the electrons generated flow through the first circuit 34.

The first condensation chamber 52 receives the second neutral gas, where the second neutral gas is condensed in the first condensation chamber 52 into a second condensed fluid (not shown). The second condensed fluid can be transported (e.g., flowed or pumped) using a pumping device 16 to the first evaporator chamber 22, where the cycle continues as thermal energy is imputed into module A. The first neutral gas and the second neutral gas are the same neutral gas, while the first condensed fluid and the second condensed fluid are the same condensed fluid, and were named differently to illustrate the flow.

As shown in FIG. 1.1, module B is positioned adjacent module A so that the outputted thermal energy 56 from module A is thermally communicated, fully or partially or with a supplemental addition from an external source, to a second evaporator chamber 72 of module B (shown as $Q1_{out} \ldots Q2_{in}$). Module A and B are similarly configured and operate in the same way. In short, the thermal energy 56 causes evaporation of a third condensed fluid (not shown) to form a third neutral gas (shown as A). A second ionically conductive membrane 74 is positioned between the second evaporator chamber 72 and a second condensation chamber 82. A third anode 76 is in contact with the second conductive membrane 74 and exposed to the second evaporator chamber 72. A second cathode 78 is in contact with the second ionically conductive membrane 74 and exposed to the second condensation chamber 82. Like the first conductive membrane 23, the second conductive membrane 74 is conductive to only cations of the third neutral gas and the catalytic reaction that occurs in module A occurs in module B to form a fourth neutral gas (A). The fourth neutral gas is condensed in the second condensation chamber 82 and transported to the second evaporator chamber 72 using a second pumping device 66.

As mentioned above, the first electrical circuit 34 is formed as a result of the first anode 26 and the first cathode 28 being in electrical communication via an external load (e.g., molybdenum, or copper). A second electrical circuit 84 is formed as a result of the second anode 76 and the second cathode 78 being electrical communication. Conversion of the first neutral gas to the first cation generates an electron and conversion of the first cation to the second neutral gas consumes an electron produces a first electrical current in the first electrical circuit 34. Conversion of the third neutral gas to the second cation generates an electron and conversion of the second cation to the fourth neutral gas consumes an electron produces a second electrical current in the second electrical circuit 84. In an embodiment, the first electrical circuit 34 and the second electrical circuit 84 can be connected either electrically in parallel or in series.

In another embodiment, the electrical connections can be arranged differently (not shown in FIG. 1.1). For example, the first cathode 28 in module A can be in electrical communication with the second anode 76 of module B and the first anode 26 of module A can be in electrical communication with the second cathode 78 of module B through a single external load. In embodiments having three or more modules, a variety of electrical combinations can be envisioned, so some modules may be electrically connected in parallel while others connected in series.

In an embodiment, the first evaporator chamber 22 and the second evaporator chamber 72 can each independently have an area of about 1 cm$^2$ to 1 m$^2$, and a length, width, and height, independently of each other, of about 1 cm to 1 m. In an embodiment, the first evaporator chamber 22 and the second evaporator chamber 72 can each independently be made of a material such as stainless steels, ceramics, or a combination thereof. In an embodiment, the first evaporator chamber 22 and the second evaporator chamber 72 can each independently be made of a material or a layer of a material (e.g., SiN, TiN, SiC, Al$_2$O$_3$) that is resistant to corrosion or reaction with the first condensed fluid or the first neutral gas.

In an embodiment, the first condensation chamber 52 and the second condensation chamber 82 can each independently have an about 1 cm$^2$ to 1 m$^2$, and a length, width, and height, independently of each other, of about 1 cm to 1 m. In an embodiment the first condensation chamber 52 and the second condensation chamber 82 can each independently be made of a material such as stainless steels, ceramics, or a combination thereof. In an embodiment, the first condensation chamber 52 and the second condensation chamber 82 can each independently be made of a material or a layer of a material (e.g., SiN, TiN, SiC, Al$_2$O$_3$) that is resistant to corrosion or reaction with the first condensed fluid or the first neutral gas.

In an embodiment, in addition to producing a favorable pressure gradient for liquid pumping, the first evaporator chamber 22 and the second evaporator chamber 72 and the first condensation chamber 52 and the second condensation chamber 82 can be made porous to increase the surface area available for heat transfer during evaporation and condensation processes, respectively. For example, when vaporization occurs within a porous structure where about 10 μm or more (e.g., up to about 1000 μm) pore feature sizes (e.g., diameter) and the non-wetting/wetting coating can produce a capillary pressure increase/decrease of about $10^4$ Pa or less. Condensation occurs within a porous structure where about 1 μm or less (e.g., 0.01 μm) pore feature sizes and the non-wetting/wetting coating can produce a capillary pressure increase/decrease of about $10^5$ Pa. The net difference between these capillary pressure increases/decreases in the evaporator chamber and condensation chamber produces the pressure gradient which drives the liquid flow through wicking structure from the condenser to the evaporator. It should be noted that the pore feature size can be about 0.001 to 1000 μm, and the pore feature size can be adjusted to accomplish the desired purpose.

In an embodiment, the first condensed fluid and the second condensed fluid can each independently be Na, Li, K, H$_2$, Mg, Ag, Ca, Sr, or Ba. In an embodiment, the first neutral gas, the second neutral gas, the third neutral gas, and the fourth neutral gas can each independently be Na, Li, K, H$_2$, Mg, Ag, Ca, Sr, or Ba. In an embodiment, the first cation and the second cation can each independently be Na$^+$, Li$^+$, K$^+$, H$^+$, Mg$^{2+}$, Ag$^+$, Ca$^{2+}$, Pb$^+$, Sr$^{2+}$, or Ba$^{2+}$.

In an embodiment, the first anode 26, the first cathode 28, the second anode 76, and the second cathode 78 can each independently be made of materials selected from: Mo, TiN, TiC, TiB$_2$, TiO$_2$, Rh$_x$W (x=0.5-3), LaB$_6$, mixed ionic-electronic conducting metal oxides, including TiN/Na$_x$—TiO$_2$ and Mo/Na$_x$—TiO$_2$ (x=0-1) or a combination thereof. In an embodiment, the first anode 26, the first cathode 28, the second anode 76, and the second cathode 78 can each independently be a porous electrode or a three dimensional porous electrode. A porous electrode can include small size grains (e.g., about 0.01-1 μm). In an embodiment, the three dimensional porous structure allows for the transportation of neutral gas. In an embodiment, the first anode 26, the first cathode 28, the second anode 76, and the second cathode 78 can each independently have a surface area of about 1 cm$^2$ to 1 m$^2$ and each can independently have a thickness of about 100 nm to 100 microns.

In an embodiment, the first conductive membrane 24 and the second conductive membrane 74 can each be made of the same materials or made of different materials. In an embodiment, the first conductive membrane 24 and the second conductive membrane 74 can be made of a material selected from: Al$_2$O$_3$, Na$_{1+x}$Zr$_2$Si$_x$P$_{3-x}$O$_{12}$ (x=0-3), Na$_x$M$_w$Si$_y$O$_z$ (x=2-6, y=2-4, z=10-12, M is a stabilizing metal e.g., Zr, Y with w=0-3), Li$_{2+2x}$Zn$_{1-x}$GeO$_4$ (x=0-1), C$_7$HF$_{13}$O$_5$SC$_2$F$_4$, BaZr$_{1-x}$Y$_x$O$_{3-x}$ (x=0-1), or a combination thereof. In an embodiment, the first conductive membrane 24 and the second conductive membrane 74 can include an additive selected from: Na, Li, K, H$_2$O, Mg, Ag, Ca, Sr, Ba, P, Y, Zr, Al, Si, Ti, Hf, or a combination thereof. In an embodiment, the first conductive membrane 24 and the second conductive membrane 74 are each only permeable to ions generated from the neutral gas and these can include: Na$^+$, Li$^+$, K$^+$, H$^+$, Mg$^{2+}$, Ag$^+$, Ca$^{2+}$, Pb$^+$, Sr$^{2+}$, and Ba$^{2+}$. In an embodiment, the first conductive membrane 24 and the second conductive membrane 74 can each independently have a thickness of about 100 microns to 10 millimeter and a cross sectional area on each side of the membrane of about 1 cm² to 1 m².

In an embodiment, the pumping device 16 and the pumping device 66 can each independently be an actively powered pump or a capillary pump, where the capillary pump uses capillary forces to move condensed fluid from condensing chamber to the evaporator chamber. In an embodiment, the pumping device has a length of about 1 cm to 50 cm, a width of about 100 microns to 10 cm, and a height of about 100 microns to 1 cm.

In an embodiment, the pumping device 16 and the pumping device 66 can each independently be a wick. In an embodiment, the wick can have a graded structure with pore size increasing from its part connected to the condenser toward its part connected to the evaporator. In an embodiment, the wick has a capillary pressure gradient from along the wick in the area of the condensation chamber to the area of the evaporator chamber. Flow driven by capillary pressure gradient resulting from highest liquid pressure at the condensation chamber down to lowest pressure in the evaporator chamber (local capillary pressure head is inversely proportional to the void/pore size).

In an embodiment, the wick can be graded (i.e., with variable pore size) to minimize the viscous pressure losses, as well as to reduce the parasitic heat transfer between the hot evaporator chamber and cold condensation chamber through the high thermal conductivity liquid in the wick. In an embodiment, the wick can have a relatively low thermal resistance so that thermal energy is not communicated from the evaporator chamber to the condensation chamber. The wick structure could be made of a collection of segments or pipes filled with a porous wicking material and separated by void spaces with imbedded radiation shields in order to minimize the heat transfer by conduction, convection and radiation between the evaporator and condenser.

In an embodiment, the wick can be graded with a gradual change in the pore size from a first set of pores in the area of the wick in the condensation chamber to a second set of pores in the area of the wick in the evaporating chamber. The first set of pores has a smaller diameter (e.g., about 100 nm to 1 μm) than the second set of pores (e.g., about 10 μm to 100 μm) for the non-wetting material; the first set of pores has a larger diameter (e.g., about 10 μm to 100 μm) than the second set of pores (e.g., about 100 nm to 1 μm) for the wetting material. In an embodiment, the wick can be made of a material such as stainless steels, ceramics, or coated stainless steels and ceramics.

In an embodiment, the thermal energy (e.g., heat source) can include a wide variety of sources from fuels to heat generated by a water heater. In an embodiment, the thermal energy can be from: combustible gases (e.g., natural gas, $H_2$, $C_XH_Y$, and the like), combustible liquid fuels (e.g., gasoline, propane, butane, and the like), combustible solid fuels (e.g., coal, wood, and the like), nuclear sources (e.g., radioisotopes, nuclear reactors, and the like), process heat sources (e.g., gases, molten metals, molten salts, and the like), radiative heat sources (e.g., solar, lasers, optical radiators, etc.), which includes devices, engines, and the like that may use these. In other words, any source of thermal energy can be harnessed and used to provide the thermal energy to produce electrical energy using embodiments of the present disclosure.

FIG. 1.2 illustrates an embodiment of another multi-stage thermo-electro-chemical converter 100. FIG. 1.2 illustrates a first evaporator chamber 122, where a first heat source 112 is in thermal communication with the first evaporator chamber 122. A first condensed fluid (not shown) is evaporated using the thermal energy 114 in the first evaporator chamber 122 to form a first neutral gas (shown as A).

A first ionically conductive membrane 124 is positioned between the first evaporator chamber 122 and a first plenum 132. A first anode 126 is in contact (e.g., disposed on the surface and/or recessed into the ionically conductive membrane) with the first conductive membrane 124 and exposed (e.g., so that the first conductive membrane 124 faces) to the evaporator chamber 122. A first cathode 128 is in contact with the first ionically conductive membrane 124 and exposed to the first plenum 132. In an embodiment, the first conductive membrane 124 is conductive to only cations of the first neutral gas.

In an embodiment, a first cation ($A^+$) and an electron are formed from the interaction of the first neutral gas with the first ionically conductive membrane 124 and the first anode 126. The first cations flow across the first ionically conductive membrane 124. The first cathode 128 interacts with the first cation and an electron at contact with the first ionically conductive membrane 124 to produce a second neutral gas (also shown as A).

A structure 156 is positioned between the first plenum 132 and a second plenum 142 (as well as between the first evaporator chamber 122 and the first condensation chamber 152). The first plenum 132 and the second plenum 142 are connected to one another via a connecting channel 134 so that the second plenum 142 receives the second neutral gas. In an embodiment, the area of the first plenum 132 and the second plenum 142 can be the same or different.

The structure 156 can be made of a material that reduces radiative and non-radiative energy exchange among the different regions of the thermo-electro-chemical converter 100. In an embodiment the structure 156 can be made of materials such as stainless steels, ceramics, or radiation shields including layers of materials effectively reflecting thermal radiation. In an embodiment, the structure 156 can have a thickness between each region of about 1 cm to 50 cm.

A second ionically conductive membrane 144 is positioned between the second plenum 142 and a condensation chamber 152. A second anode 172 is positioned on the second ionically conductive membrane 144 and exposed to the second plenum 142. A second cathode 148 is in contact with the second ionically conductive membrane 144 and exposed to the condensation chamber 152. The second ionically conductive membrane 144 is conductive to only cations of the second neutral gas.

A second cation is formed from the interaction of the second neutral gas with the second ionically conductive membrane 144 and the second anode 146. The second cation flows across the second ionically conductive membrane 144. The second cathode 148 interacts with the second cation and an electron to produce the third neutral gas at contact with the second ionically conductive membrane 144. The condensation chamber receives the third neutral gas.

The condensation chamber 152 is in thermal communication with a cooling element 154 to remove any excess thermal energy (155) or to divert the thermal energy. The third neutral gas is condensed into a second condensed fluid in the condensation chamber 152. The second condensed fluid can be transported (e.g., flowed or pumped) using a pumping device 116 to the first evaporator chamber 122, where the cycle continues as thermal energy is imputed into the first evaporating chamber 122. The first neutral gas, the second neutral gas, and the third neutral gas are the same neutral gas, while the first condensed fluid and the second condensed fluid are the same condensed fluid, and were named differently to illustrate the flow.

In an embodiment, a second heat source 136 can be used to provide thermal energy 138 to the second plenum 142. The second heat source 136 can be the same or different than the first heat source 112. Inclusion of the second heat source 136 can be advantageous in generating additional electrical energy and more efficiently using the thermal heat available.

Dashed arrow 162 represent the flow of the thermo-electro-chemical converter 100. The thermal energy follows this arrow as does the flow of the working fluid (condensed fluid/neutral gas/cations/neutral gas/cations/neutral gas/condensed fluid). This flow represents the cycle used to generate electrical energy, as discussed in additional detail below.

An electrical circuit is formed as a result of the first cathode 128 and the second anode 146 being in electrical communication and the first anode 126 and the second cathode 148 being electrical communication. Electrons in the second anode 146 travel to the first cathode 128 via electrical connection 172 (e.g., copper wire or the like). Electrons in the first anode 126 travel through the electrical circuit 162 and into the second cathode 148. The second anode 146, first cathode 128, first anode 126 and the second cathode 148 are connected electrically in series. The conversion of the first neutral gas to the first cation generates an electron, conversion of the first cation to the second neutral gas consumes an electron, conversion of the second neutral gas to the second cation generates an electron, and conversion of the second cation to the third neutral gas consumes an electron, where the generation and consumption of the electrons produces an electrical current in the electrical circuit 162.

In an embodiment, the hotside (e.g., side of the evaporator chamber where the thermal energy is introduced) temperature of the evaporator chamber 122 can reach about 850° C. for sodium to maintain a pressure below 1 atm (e.g., vacuum device) or in another embodiment the temperature can exceed this with the pressure exceeding 1 atm (e.g., pressurized device). For other embodiments with other working fluids the hotside temperature for a vacuum device is below the fluid's saturation temperature at 1 atm and for a pressurized device the hotside temperature exceeds the fluid's saturation temperature.

In an embodiment, the condenser temperature can be as low as about 100° C. for sodium. For other embodiments with other working fluids the condenser is at the melting point of working the fluid. The pressure in the evaporator chamber 122 and condensation chamber 152 correspond to the saturation pressure at the operating temperature. In an embodiment, the temperature of the first plenum 132 and the second plenum 142 should be maintained between the evaporator or condenser temperature, respectively. In an alternative embodiment with reheat, it is possible for the second plenum 152 to achieve a temperature up-to but not equal to the hotside temperature of the evaporator chamber 122.

In an embodiment, a first thermal radiation structure (not shown) can be included in the thermo-electro-chemical converter 100 to reduce or eliminate direct thermal communication between the first cathode 128 and the first plenum 132. The first thermal radiation structure is positioned between the first cathode 128 and the first plenum 132. The first thermal radiation structure is permeable to the second neutral gas. In an embodiment, the first thermal radiation structure can be made of a material such as metals, ceramics, coated materials or any other high reflectivity (e.g., polished) materials or combination therefor. In an embodiment, the first thermal radiation structure can have a length of about 1 cm to 1 m, a height of about 0.01 mm to 1 mm, and a width of about 1 cm to 1 m.

In an embodiment, a second thermal radiation structure (not shown) can be included in the thermo-electro-chemical converter 100 to reduce or eliminate direct thermal communication between the second cathode 148 and the first condensation chamber 152. The second thermal radiation structure is positioned between the second cathode 148 and the first condensation chamber 152. The second thermal radiation structure is permeable to the second neutral gas. In an embodiment, the second thermal radiation structure can be made of a material such as metals, ceramics, coated materials or any other high reflectivity (e.g., polished) materials or combination therefor. In an embodiment, the second thermal radiation structure can have a length of about 1 cm to 1 m, a height of about 0.01 mm to 1 mm, and a width of about 1 cm to 1 m.

In an embodiment, heat is removed by cooling element 154 that can vary by applications inclusive of forced air convection cooling, natural convection cooling, forced liquid cooling (e.g., water, oil, molten salts), phase-change cooling (e.g., pool boiling or evaporative cooling) or thermal radiation. As an example of a specific embodiment, the cooling element 154 can include a plate-and-fin heat exchanger where the working fluid is oil which then circulates to an external air cooled heat exchanger. As another example of a specific embodiment, the cooling element 154 includes a plate-and-fin heat exchanger directly cooling to the air by forced (e.g., fan) or natural (e.g., no fan) convections. A third example of a specific embodiment, the cooling element 154 includes a shell-and-tube heat exchanger with water circulating to a hot water tank. A forth example, the cooling element 154 includes a passive operated heat pipe or two-phase thermal syphon.

In an embodiment, the first evaporator chamber 122 can have an about 1 cm$^2$ to 1 m$^2$, and a length, width, and height, independently of each other, of about 0.1 mm to 10 cm. In an embodiment, the first evaporator chamber 122 can be made of a material such as stainless steels, or ceramics or a combination thereof. In an embodiment, the first evaporator chamber 122 can be made of a material or a layer of a material (e.g., SiN, TiN, SiC, Al$_2$O$_3$) that is resistant to corrosion or reaction with the first condensed fluid or the first neutral gas.

In an embodiment, the first plenum 132 and the second plenum 142 can each independently have an about 1 cm$^2$ to 1 m$^2$, and a length, width, and height, independently of each other, of about 1 mm to 10 cm. In an embodiment, the first plenum 132 and the second plenum 142 can each independently be made of a material such as stainless steels, or ceramics or a combination thereof. In an embodiment, the first plenum 132 and the second plenum 142 can be made of a material or a layer of a material (e.g., SiN, TiN, SiC, Al$_2$O$_3$) that is resistant to corrosion or reaction with the first condensed fluid or the first neutral gas.

In an embodiment, the first plenum 132 has a smaller area than the second plenum 142 to accommodate the larger area of the second anode 146, second cathode 148, and second ionically conductive membrane 144, which is maintained at a lower temperature; lower temperature materials may require larger areas in order to match the current.

As stated above, the connecting channel 134 is a channel through the structure 156. In an embodiment, the connecting channel 134 can have a length of about 1 cm to 50 cm, a width of about 100 microns to 10 cm, and a height of about 100 microns to 1 cm.

In an embodiment, the first condensation chamber 152 can have an about 1 cm² to 1 m², and a length, width, and height, independently of each other, of about 0.1 mm to 10 cm. In an embodiment the first condensation chamber 152 can be made of a material such as stainless steels, ceramics, or a combination thereof. In an embodiment, the first condensation chamber 152 can be made of a material or a layer of a material that is resistant to corrosion or reaction with the first condensed fluid or the first neutral gas.

In an embodiment, the first condensed fluid and the second condensed fluid can each independently be Na, Li, K, $H_2$, Mg, Ag, Ca, Sr, or Ba or a combination thereof. In an embodiment, the first neutral gas, the second neutral gas, and the third neutral gas, can each independently be Na, Li, K, $H_2$, Mg, Ag, Ca, Sr, or Ba or a combination thereof. In an embodiment, the first cation and the second cation can each independently be $Na^+$, $Li^+$, $K^+$, $H^+$, $Mg^{2+}$, $Ag^+$, $Ca^{2+}$, $Pb^+$, $Sr^{2+}$, or $Ba^{2+}$.

In an embodiment, the first anode 126, the first cathode 128, the second anode 146, and the second cathode 148 can each independently be made of materials selected from: Mo, TiN, TiC, $TiB_2$, $TiO_2$, $Rh_xW$ (x=0.5~3), $LaB_6$, and mixed ionic-electronic conducting metal oxides, including $TiN/Na_x$—$TiO_2$ and $Mo/Na_x$—$TiO_2$ (x=0-1) or a combination thereof. In an embodiment, the first anode 126, the first cathode 128, the second anode 146, and the second cathode 148 can each independently be a porous electrode or a three dimensional porous electrode. A porous electrode can include of small size grains (e.g., pores of about 0.01-1 μm). A three dimensional porous structure allows the transportation of neutral gas. In an embodiment, the first anode 126, the first cathode 128, the second anode 146, and the second cathode 148 can each independently have a surface area of about 1 cm² to 1 m² and each can independently have a thickness of about 100 nm to 100 microns.

In an embodiment, the first conductive membrane 124 and the second conductive membrane 144 can each be made of the same materials or made of different materials. In an embodiment, the first conductive membrane 124 and the second conductive membrane 144 can be made of a material selected from: $Al_2O_3$, $Na_{1+x}Zr_2Si_xP_{3-x}O_{12}$ (x=0-3), $Na_xM_wSi_yO_z$ (x=2-6, y=2-4, z=10-12, M is a stabilizing metal e.g., Zr, Y with w=0-3) $Li_{2+2x}Zn_{1-x}GeO_4$ (x=0-1), $C_7HF_{13}O_5SC_2F_4$, and $BaZr_{1-x}Y_xO_{3-x}$ (x=0-1) or a combination thereof. In an embodiment, the first conductive membrane 24 and the second conductive membrane 74 can include an additive selected from: Na, Li, K, $H_2O$, Mg, Ag, Ca, Sr, Ba, P, Y, Zr, Al, Si, Ti, Hf, or a combination thereof. In an embodiment, the first conductive membrane 124 and the second conductive membrane 144 are each only permeable to ions generated from the neutral gas and these can include: $Na^+$, $Li^+$, $K^+$, $H^+$, $Mg^{2+}$, $Ag^+$, $Ca^{2+}$, $Pb^+$, $Sr^{2+}$, and $Ba^{2+}$. In an embodiment, the first conductive membrane 124 and the second conductive membrane 144 can each independently have a thickness of about 100 microns to 10 millimeter and a cross sectional area on each side of the membrane of about 1 cm² to 1 m².

In an embodiment, the first ionically conducting membrane 124 and the second ionically conducting membrane 144 can be the same or different temperatures. In an embodiment where the first ionically conducting membrane 124 and the second ionically conducting membrane 144 are at different temperatures, combinations of cathode and anode materials to minimize the electrochemical over potential can be used for each of the first ionically conducting membrane 124 and the second ionically conducting membrane 144. For example, some electrode materials have a lower over potential at low temperatures while other have a lower over potential at higher temperatures. Furthermore, some electrode materials are more compatible (e.g., thermal expansion matching) with low temperature and high temperature electrolytes. As a result, embodiments of the present disclosure allow for designing and selecting materials for the first ionically conducting membrane 124 and the second ionically conducting membrane 144 to maximize electrical energy production and lifetime of the components.

The pumping device 116 is the same as the pumping device 16 described in relation to FIG. 1.1. Similarly, the thermal energy stated above in reference to FIG. 1.1 can also be used as the thermal energy for the converter of FIG. 1.2.

In an embodiment, a plurality of thermo-electro-chemical converters 100 as shown in FIG. 1.2 can be included into a converting system (FIG. 2.1), where the number of thermo-electro-chemical converters 100 can be 2 to 1000. Each of the thermo-electro-chemical converters 100 can be stacked on one another. In an embodiment, a single thermal energy source can be used to provide thermal energy for each of the thermo-electro-chemical converters or multiple thermal energy sources can be used. Each of the thermo-electro-chemical converters can be electrically connected in parallel or series. Additional details regarding such a system are provided in the Example.

As described briefly herein, embodiments of the present disclosure include methods of generating electrical energy from thermal energy. In this regard, thermo-electro-chemical converters of the present disclosure can include thermo-electro-chemical converter 10 and thermo-electro-chemical converter 100.

In an embodiment, the method of generating electrical energy from thermal energy includes evaporating a first condensed fluid using thermal energy to form a first neutral gas. Then the first neutral gas is oxidized to form a first cation and an electron at the interface of a first anode and a first ionically conductive membrane. The first cation is then transported (e.g., flowed) across the first ionically conductive membrane. The first cation is then converted to a second neutral gas with an electron at the interface of a first cathode and the first conductive membrane. In an embodiment, the first anode and the first cathode are not electrically connected to one another. The first anode, the first ionically conductive membrane, and the first cathode can include those as described in FIG. 1.2

Subsequently, the second neutral gas is oxidized to form a second cation and an electron at the interface of a second anode and a second ionically conductive membrane. The second cation is transported (e.g., flowed) across the second ionically conductive membrane. The second cation is reduced to a third neutral gas using an electron at the interface of a second cathode and the second conductive membrane. In an embodiment, the second anode and the second cathode are not electrically connected to one another. In an embodiment, the first cathode and the second anode are in electrical communication and the first anode and the second cathode are in electrical communication via an external load to form a first circuit. Next, the third neutral gas is condensed to a second condensed fluid. The second anode, the second ionically conductive membrane, and the second cathode can include those as described in FIG. 1.2

As stated above, an electrical circuit is formed as a result of the first cathode and the second anode being in electrical communication and the first anode and the second cathode being electrical communication, where electrons in the second anode travel to the first cathode and electrons in the first anode travel through the electrical circuit and into the second cathode. In an embodiment, the second anode, first cathode, first anode and the second cathode are electrically connected. The conversion of the first neutral gas to the first cation generates an electron, conversion of the first cation to the second neutral gas consumes an electron, conversion of the second neutral gas to the second cation generates an electron, and conversion of the second cation to the third neutral gas consumes an electron, where the generation and consumption of the electrons produces an electrical current in the electrical circuit.

Having described the method in general, the method will now be described broadly in relation to the thermo-electro-chemical converter 100 in FIG. 1.2. In an embodiment, the method of generating electrical energy from thermal energy includes evaporating a first condensed fluid in the evaporator chamber 122 using thermal energy 114 to form a first neutral gas. Then the first neutral gas is oxidized to form a first cation and an electron at the interface of the first anode 126 and the first ionically conductive membrane 124. The first cation is then transported (e.g., flowed) across the first ionically conductive membrane 124 and is then converted to a second neutral gas with an electron at the interface of the first cathode 128 and the first ionically conductive membrane 124. In an embodiment, the first anode 126 and the first cathode 128 are not electrically connected to one another. The second neutral gas passes into the first plenum 132 and passes through the connecting channel 134 into the second plenum 142. Optionally, thermal energy 138 can be added to the second neutral gas in the second plenum 142.

Subsequently, the second neutral gas is oxidized to form a second cation and an electron at the interface of the second anode 146 and the second ionically conductive membrane 144. The second cation is transported (e.g., flowed) across the second ionically conductive membrane 144. The second cation is reduced to a third neutral gas using an electron at the interface of the second cathode 148 and the second conductive membrane 144. In an embodiment, the second anode 146 and the second cathode 148 are not electrically connected to one another. In an embodiment, the first cathode 128 and the second anode are 146 in electrical communication and the first anode 126 and the second cathode 148 are in electrical communication via an external load to form a first circuit 162. Next, the third neutral gas is condensed to the second condensed fluid in the first condensation chamber 152, where the second condensed fluid can be transported to the first evaporator chamber 122 using the pumping device 116.

While embodiments of the present disclosure are described in connection with the Examples and the corresponding text and figures, there is no intent to limit the disclosure to the embodiments in these descriptions. On the contrary, the intent is to cover all alternatives, modifications, and equivalents included within the spirit and scope of embodiments of the present disclosure.

EXAMPLE 1

An embodiment of the present disclosure provides for a modular 1 kW$_e$ thermo-electro-chemical converter with a target efficiency of 41.1%. Electrical work is extracted from the isothermal expansion of ions (e.g., sodium ions). The integrated heat engine concepts enable a step-change in thermal-to-electric energy conversion. An advantage of the present embodiment can be due, at least in part, to the multi-stage stack design, which allows for regeneration and inter-stage reheat to better utilize the input from a heat source (e.g., a low emission combustor). In comparison to current technologies, the efficiency of embodiments of the present disclosure may be two times or more than that of the best previously technologies. Furthermore, another advantage of the embodiments of the present disclosure is more efficient energy conversion at lower temperatures ($T_H$=1150 K, $T_C$=450 K). An advantage of operating at lower temperatures is that the stability and lifetime of the solid-electrolytes can be significantly extended. In an addition, an embodiment includes use of three dimensional porous electrodes having substantially lower overpotentials relative to current technologies. In sum, these benefits result in an improvement in efficiency and stability of operation all at a lower cost.

Embodiments of the present disclosure are advantageous for one or more of the following: (i) A multi-stage design has the potential to achieve the targeted high efficiencies by utilizing regeneration and/or reheat, thus allowing for lower cold side operation suitable for coupling to water heaters; (ii) The stability and lifetime of the electrolyte are sufficiently improved by operating at lower temperatures with an impurity mitigation strategy that prevents electrode/electrolyte degradation; (iii) 3D porous electrodes made of refractory alloys and mixed ionic-electronic conducting metal oxides for the first, high-temperature stage and Mo-based electrodes for the second, low-temperature stage drastically reduce the overpotential and show improved lifetime; and (iv) The thermal-fluid management are improved by structuring the evaporator to be less sodium-phobic (thus promoting quasi-film vaporization reducing the super-heating and energy destruction), structuring the condenser to be more sodium-phobic (thus promoting dropwise condensation reducing the under-cooling and energy destruction), and topologically grading the wick structure establishing the strong capillary pressure gradient to enable fully passive capillary pumping.

FIGS. 2.1 and 2.2 illustrate an embodiment of the converter stack that includes of a stack of fifteen independent 60-80 W$_e$ modules (thermo-electro-chemical converter). Radiation shields separate individual (circular) modules and allow for reheat with combustion exhaust. Within a module, two stages exist that allow for the isothermal expansion of sodium ions, for example, through a solid-electrolyte; the first stage is between the evaporator and the upper plenum A and the second stage is between the upper plenum B and the condenser. Staging allows this device to minimize entropy production and allows for the regeneration of rejected heat from the first stage to the second. Reheat, optionally, in the second state is accomplished by routing the combustor exhaust stream over the top plate. Integrated cooling recovers useful heat at a low temperature condenser for water heating. The electrolyte has the unique property that it only allows ions through, while it blocks neutral atoms; reversible ionization occurs on the electrodes and electrons traverse an external circuit. If a plug-n-play module is ever defective, it can be replaced quickly and easily.

An embodiment of the present disclosure includes a multi-stage electro-chemical conversion concept with integrated reheat and regeneration, new high- and low-temperature, long-lived, low-overpotential, 3D porous electrodes, and nano/micro-structure, high-performance thermo-fluid evaporators, condensers, and wicking structures for use with sodium.

Unlike other similar ion expansion converters, our converter uses multiple stages with inter-stage regeneration and reheat, affording more efficient conversion at lower temperatures (especially in the second stage). As an example, operating between $T_H$=1150 K and $T_{int}$=750 K, we estimate a first stage efficiency of 28.3%. The second stage would operate between $T_{int}$ and $T_C$=450 K, with an efficiency of 21.9% thus the overall cycle efficiency would exceed 40% (before combustion, thermo-electrochemical, and alternator losses). State-of-the-art single stage ion expansion converters have only demonstrated efficiencies of ~20%. Staging allows us to realize lower condenser temperatures and thus higher efficiencies. We will realize >2× improvement in efficiency with our multi-stage reheat and regeneration concept using new solid electrolytes.

The reason for these lower conversion efficiencies in the previously demonstrated devices is in large part due to the fact that they were not properly thermally engineered (e.g., thermal management). It can be shown that previous devices lost >50% of the input heat, thus losing at an onset, about half of the conversion potential by reducing the amount of heat to be converted. This is because catalyst was previously manufactured as tubes (cylinders); where the present design uses ultra-thin plates (e.g., tape cast). Thermally, tube design is not desirable because the evaporator and condenser are in direct view of one another. Since the catalyst is largely transparent to IR and therefore radiation loses are significant in previous device geometries. Our converter properly thermally manages this device via the flow of exhaust over an intermediate stage (i.e., using it for reheat, see, FIG. 2.4) and by thermal isolation of the evaporator and condenser; by placing the condenser and evaporator on the same plane with vanishingly small direct radiation exchange between them (zero view factor). Furthermore, our condenser is designed with large open-pore micro-structure for drop-wise condensation within the wick, which also creates a radiation shield due to multiple scattering in porous media. In addition, lateral thermal leakage is significantly reduced by the use of external radiation shields and thin (low thermal conductivity) structural materials.

In addition, the present converter minimizes thermal losses through the electrical leads unlike previous devices; the leads are on the periphery of our devices where the temperature is the lowest rather than at the hot side. This is made possible because our design use the housing as the electrical ground. Not only does this improve electrical safety of the device, it makes it possible to create a plug-n-play stack where individual modules can be replaced if they ever become defective. In this geometry, the two stages are connected electrically in series; thus we get double the voltage; we effectively match the current by control of the electrolyte surface area to maintain low current densities and therefore long lifetimes. Previous devices had separate modules connected electrically in series in order to realize larger voltages but were connected thermally in parallel, causing more thermal leakage. We naturally realize larger currents at lower current densities because our device has larger electrolyte surface area. Thus, each module will have a nominal voltage of 1.3 $V_{DC}$ due to dual staging, which is 30% higher than previous devices. Then by connecting fifteen modules in our stack, we can realize a target power of 1 kW$_e$ with voltages as high as ~20 $V_{DC}$.

One of the innovations of the present converter is the thermal management. The integrated multi-stage design allows for regeneration and reheats, thus better utilizing all the heat available to achieve high thermal efficiency. As a state-of-the-art comparison, the efficiency of our proposed engine with reheat and regeneration is a 2× improvement over the art.

We effectively regenerate in the upper plenum B because the heat rejected at the high temperature first stage directly provides heat input to the second, lower temperature stage. We can also reheat in the upper plenum B by diverting additional heat from the exhaust to the upper plenum. Flowing the exhaust over the top plate is extremely advantageous because it creates an insulating condition and prevents heat from leaking out of the devices. Effectively, heat in the engine is confined to flow in through the evaporator and out through the condenser; by allowing for heat conduction along the sides (i.e., inside diameter) and by adding additional conduction channels to the top plate (FIG. 2.3), additional heat is supplied to the second stage. The additional heat is converted directly to electricity because the conversion process involves the isothermal expansion of ions. This reheat step in the second stage modifies the T-s diagram, as shown in FIG. 2.4, allowing the dual stage to reach lower temperatures with minimum heat loss. By increasing the enclosed area we are able to better utilize the sensible heat and achieve record efficiencies.

Another innovation is the use of structural control to enhance phase change and permit passive return of sodium via a graded wick (FIG. 2.5). In our converter, supporting top and bottom plates are coated with a sodium resistant ceramic (e.g., TiN, SiC, or $Al_2O_3$, commercially available services via CVD) to prevent sodium corrosion and leaching of impurity metals. This same material can be used to create structures to enhance evaporation, condensation, and wicking. The coating material is inherently sodium-phobic which is why it is useful as a barrier layer. By making inverted structures via fine grain powder sintering we are able to create super-sodium-phobic surfaces, which promote drop-wise condensation in the condenser. Drop-wise condensation minimizes conduction resistance (and lowers wall sub-cooling), makes removing the condensate easier, and keeps nucleation sites available and active. Importantly, the structure of the condenser promotes droplet formation within the porous framework, thus facilitating an easy introduction of condensate into a wicking structure to be returned to the evaporator via capillary pumping.

Sodium wicks are commonly used in commercially available high temperature sodium heat pipes. To achieve the proper gradient of liquid capillary pressure, the wicking structure has to be graded with smaller particles closer to the condenser and larger particles closer to the evaporator to pump fluid against the vapor back pressure (FIG. 2.5).

While the material is inherently sodium-phobic, structural control via multi-scale hierarchy can actually make the surface less sodium-phobic without sacrificing chemical stability. For example, large grain powders can be sintered together at the evaporator creating re-entrant cavities, which promote film boiling while avoiding the "dead" zones with entrapped vapor pockets. Collectively, this allows one to stabilize the boiling/evaporation process, increase liquid-to-solid contact area, and reduce film conduction resistance. This reduces the required wall superheat for boiling incipience, avoiding localized dry-out, and improves heat transfer capability. The evaporator, wick, and condenser porous structures can all be designed and fabricated separately and then brazed to bottom plate.

Another innovation includes the development of 3D porous electrodes, which have significantly reduced the overpotential in batteries and fuel cells. The overpotential is the voltage required to overcome the intrinsic electrochemical kinetics limitation. The overpotential depends on electrode material, cell design, and current density. As the current density increases, the overpotential increases proportionally and thus the delivered voltage decreases. Our concept lowers current densities due to our device design.

The overpotential has three main contributions: (i) an ionic resistance contribution, (ii) a transport contribution, and (iii) a kinetic contribution.

The transport and kinetic overpotentials are addressed by the introduction of 3D porous electrodes. First, the surface of the solid-electrolyte is modified (by heterogeneous firing, grinding, and etching) to create a high surface area electrolyte, which minimizes the contact resistance. On top of that, hierarchal 3D porous electrodes, including a brazed electrode mesh and conformally (sputter or CVD) deposited electrodes, will be coated onto the solid-electrolyte (FIG. 2.6). The optimized 3D architecture of the electrodes increases the number of active three-phase boundary (sodium, electrode, and electrolyte) sites, which facilitate the ionization and recombination kinetics of sodium. In addition, we will design interconnected large pore spaces in the 3D porous structure, which help reduce the transport overpotentials.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

We claim:

1. A thermo-electro-chemical converter, comprising:
   an evaporator chamber, wherein a first heat source is in thermal communication with the evaporator chamber, wherein the evaporator chamber is configured to evaporate a first condensed fluid to form a first neutral gas;
   a first plenum;
   a first ionically conductive membrane positioned between the evaporator chamber and the first plenum, wherein a first anode is in contact with the first ionically conductive membrane and exposed to the evaporator chamber, wherein a first cathode is in contact with the first ionically conductive membrane on a side opposite the evaporator chamber, wherein the first ionically conductive membrane is conductive to only first cations of the first neutral gas, wherein the first ionically conductive membrane and the first anode are configured to interact with the first neutral gas to form one of the first cations and a first electron, wherein the first ionically conductive membrane is configured to produce a second neutral gas in the first plenum by interaction of the first cathode with the first cation and the first election;
   a second plenum, wherein a connecting channel connects the first plenum with the second plenum and is configured to receive the second neutral gas from the first plenum through the connecting channel;
   a second ionically conductive membrane positioned between the second plenum and a condensation chamber, wherein a second anode is positioned on the second ionically conductive membrane and exposed to the second plenum, wherein a second cathode is in contact with the second ionically conductive membrane and exposed to the condensation chamber, wherein the second ionically conductive membrane is conductive to only second cations of the second neutral gas, wherein the second ionically conductive membrane and the second anode are configured to form the second cation from the interaction of the second neutral gas, wherein the second cathode is configured to interact with the second cation and a second electron to produce a third neutral gas, wherein the condensation chamber is configured to receive the third neutral gas, wherein the condensation chamber is in thermal communication with a cooling element, wherein the condensation chamber is configured to condense the third neutral gas into a second condensed fluid; and
   a pumping device connecting the condensation chamber and the evaporator chamber, wherein the condensation chamber and the evaporator chamber are configured so that the second condensed fluid flows from the condensation chamber to the evaporator chamber,
   wherein an electrical circuit is formed as a result of the first cathode and the second anode being in electrical communication and the first anode and the second cathode being in electrical communication, wherein the electrical circuit is configured to generate an electrical current.

2. The thermo-electro-chemical converter of claim 1, wherein the first cation and the second cation are selected from the group consisting of: $Na^+$, $Li^+$, $K^+$, $H^+$, $Mg^{2+}$, $Ag^+$, $Ca^{2+}$, $Pb^+$, $Sr^{2+}$, $Ba^{2+}$, and a combination thereof.

3. The thermo-electro-chemical converter of claim 1, wherein the first neutral gas, the second neutral gas, and the third neutral gas are selected from the group consisting of: Na, Li, K, $H_2$, Mg, Ag, Ca, Sr, Ba, and a combination thereof.

4. The thermo-electro-chemical converter of claim 1, wherein the first ionically conductive membrane and the second ionically conductive membrane are made of the same materials or made of different electronically non-conductive materials.

5. The thermo-electro-chemical converter of claim 1, wherein the first ionically conductive membrane and the second ionically conductive membrane are each independently made of a material selected from the group consisting of: $Al_2O_3$; $Na_{1+x}Zr_2Si_xP_{3-x}O_{12}$, x=0-3; $Na_rM_wSi_yO_z$, r=2-6, y=2-4, z=10-12, w=0-3, M is Zr or Y; $Li_{2+2s}Zn_{1-s}GeO_4$, s=0-1; $C_7HF_{13}O_6SC_2F_4$; $BaZr_{1-t}Y_tO_{3-t}$, t=0-1 and a combination thereof.

6. The thermo-electro-chemical converter of claim 1, wherein the first ionically conductive membrane and the second ionically conductive membrane are each independently only permeable to ions selected from the group consisting of: $Na^+$, $Li^+$, $K^+$, $H^+$, $Mg^{2+}$, $Ag^+$, $Ca^{2+}$, $Pb^+$, $Sr^{2+}$, $Ba^{2+}$ and a combination thereof.

7. The thermo-electro-chemical converter of claim 1, wherein a second heat source is in thermal communication with the second plenum.

8. The converter of claim 1, wherein the first plenum has a smaller area than the second plenum.

9. The thermo-electro-chemical converter of claim 1, wherein the first plenum is at a lower temperature than the second plenum.

10. The thermo-electro-chemical converter of claim 1, wherein the pumping device is an actively powered pump or capillary pump, wherein the capillary pump is configured to use capillary forces to move fluid from the condensing chamber to the evaporator chamber.

11. The thermo-electro-chemical converter of claim 1, wherein the first anode and the second anode are each porous electrodes.

12. The thermo-electro-chemical converter of claim 1, wherein the first anode, the second anode, the first cathode, and the second cathode are made of materials selected from the group consisting of: Mo, TiN, TiC, $TiB_2$, $TiO_2$, $Rh_xW$ x=0.5-3, $LaB_6$, $TiN/Na_g$—$TiO_2$ and $Mo/Na_u$—$TiO_2$ q=0-1 and u=0-1, and a combination thereof.

13. The thermo-electro-chemical converter of claim 1, wherein the first heat source is selected from the group consisting of: combustible gases, combustible liquid fuels, combustible solid fuels, nuclear sources, process heat sources, and radiative heat sources.

14. The thermo-electro-chemical converter of claim 1, further comprising:
a first thermal radiation structure, wherein the first thermal radiation structure is permeable to the second neutral gas, wherein the first thermal radiation structure is positioned between the first cathode and the first plenum; and
a second thermal radiation structure, wherein the second thermal radiation structure is permeable to the third neutral gas, wherein the second thermal radiation structure is positioned between the second cathode and the evaporator chamber.

15. A system comprising:
a plurality of thermo-electro-chemical converters of claim 1, wherein each of the plurality of thermo-electro-chemical converters share the first heat source and are electrically connected in parallel or series.

16. A method of generating electrical energy from thermal energy, comprising:
evaporating a first condensed fluid using thermal energy to form a first neutral gas;
oxidizing the first neutral gas to form a first cation and a first electron at the interface of a first anode and a first ionically conductive membrane;
flowing the first cation across the first ionically conductive membrane;
reducing the first cation to a second neutral gas with a second electron at the interface of a first cathode and the first conductive membrane, wherein the first anode and the first cathode are not electrically connected to one another;
oxidizing the second neutral gas to form a second cation and a third electron at the interface of a second anode and a second ionically conductive membrane;
flowing the second cation across the second ionically conductive membrane;
reducing the second cation to a third neutral gas using a fourth electron at the interface of a second cathode and the second conductive membrane, wherein the second anode and the second cathode are not electrically connected to one another; and
condensing the third neutral gas to a second condensed fluid,
wherein an electrical circuit is formed as a result of the first cathode and the second anode being in electrical communication and the first anode and the second cathode being in electrical communication, wherein the third electron in the second anode travel to the first cathode, wherein the first electron in the first anode travel through the electrical circuit and into the second cathode, wherein the second anode, the first cathode, the first anode and the second cathode are electrically connected, wherein conversion of the first neutral gas to the first cation generates a fifth electron, conversion of the first cation to the second neutral gas consumes a sixth electron, conversion of the second neutral gas to the second cation generates a seventh electron, and conversion of the second cation to the third neutral gas consumes an eighth electron, wherein the generation and consumption of the first to eighth electrons produces an electrical current in the electrical circuit.

17. A thermo-electro-chemical converter, comprising:
a first evaporator chamber, wherein a first heat source is in thermal communication with the first evaporator chamber, wherein the first evaporator chamber is configured to evaporate a first condensed fluid to form a first neutral gas;
a first ionically conductive membrane positioned between the first evaporator chamber and a first condensation chamber, wherein a first anode is in contact with the first conductive membrane and exposed to the first evaporator chamber, wherein a first cathode is in contact with the first ionically conductive membrane and exposed to the first condensation chamber, wherein the first conductive membrane is conductive to only first cations of the first neutral gas, wherein the first ionically conductive membrane and the first anode are configured to form the first cation and a first electron from the neutral gas, wherein the first ionically conductive membrane and the first cathode are configured to produce a second neutral gas from the first cation and the first electron, wherein the first condensation chamber is configured to receive the second neutral gas, wherein the first condensation chamber is configured to condense the second neutral gas into a second condensed fluid;
a second evaporator chamber, wherein the first condensation chamber is in thermal communication with the second evaporator chamber, wherein the first condensation chamber is configured to produce heat to cause evaporation of a third condensed fluid to form a third neutral gas; and
a second ionically conductive membrane positioned between the second evaporator chamber and a second condensation chamber, wherein a third anode is in contact with the second conductive membrane and exposed to the second evaporator chamber, wherein a second cathode is in contact with the second ionically conductive membrane and exposed to the second condensation chamber, wherein the second conductive membrane is conductive to only second cations of the third neutral gas, wherein the second ionically conductive membrane and a second anode are configured to form the second cation and a second electron from the third neutral gas, wherein the second cathode and the second ionically conductive membrane are configured to interact with the second cation and a third electron to produce a fourth neutral gas, wherein the second condensation chamber is configured to receive the fourth neutral gas, wherein the second condensation chamber is configured to condense the fourth neutral gas into a fourth condensed fluid,
wherein a first electrical circuit is formed as a result of the first anode and the first cathode being in electrical communication and a second electrical circuit is formed as a result of the second anode and the second cathode being in electrical communication, wherein the first electrical circuit and the second electrical circuit are electrically connected.

18. A thermo-electro-chemical converter, comprising:
an evaporator chamber, wherein a first heat source is in thermal communication with the evaporator chamber;
a first plenum;
a first ionically conductive membrane positioned between the evaporator chamber and the first plenum, wherein a first anode is in contact with the first ionically conductive membrane and exposed to the evaporator chamber, wherein a first cathode is in contact with the first ionically conductive membrane on a side opposite the evaporator chamber, wherein the first ionically conductive membrane is conductive to only first cations of a first neutral gas;
a second plenum, wherein a connecting channel connects the first plenum with the second plenum;
a second ionically conductive membrane positioned between the second plenum and a condensation chamber, wherein a second anode is positioned on the second ionically conductive membrane and exposed to the second plenum, wherein a second cathode is in contact with the second ionically conductive membrane and exposed to the condensation chamber, wherein the second ionically conductive membrane is conductive to only second cations of a second neutral gas, wherein the condensation chamber is in thermal communication with a cooling element; and
a pumping device connecting the condensation chamber and the evaporator chamber,
wherein an electrical circuit is formed as a result of the first cathode and the second anode being in electrical communication and the first anode and the second cathode being in electrical communication, wherein the second anode, the first cathode, the first anode, and the second cathode are electrically connected.

19. A thermo-electro-chemical converter, comprising:
a first evaporator chamber, wherein a first heat source is in thermal communication with the first evaporator chamber;
a first ionically conductive membrane positioned between the first evaporator chamber and a first condensation chamber, wherein a first anode is in contact with the first conductive membrane and exposed to the first evaporator chamber, wherein a first cathode is in contact with the first ionically conductive membrane and exposed to the first condensation chamber, wherein the first conductive membrane is conductive to only first cations of a first neutral gas;
a second evaporator chamber, wherein the first condensation chamber is in thermal communication with the second evaporator chamber; and
a second ionically conductive membrane positioned between the second evaporator chamber and a second condensation chamber, wherein a third anode is in contact with the second conductive membrane and exposed to the second evaporator chamber, wherein a second cathode is in contact with the second ionically conductive membrane and exposed to the second condensation chamber, wherein the second conductive membrane is conductive to only third cations of a third neutral gas,
wherein a first electrical circuit is formed as a result of the first anode and the first cathode being in electrical communication and a second electrical circuit is formed as a result of a second anode and the second cathode being in electrical communication, wherein the first electrical circuit and the second electrical circuit are electrically connected.

* * * * *